(12) United States Patent
Matsui et al.

(10) Patent No.: US 10,436,093 B2
(45) Date of Patent: Oct. 8, 2019

(54) ENGINE DEVICE

(71) Applicant: Yanmar Co. Ltd., Osaka-shi, Osaka (JP)

(72) Inventors: Yu Matsui, Osaka (JP); Yoshiyuki Sandou, Osaka (JP)

(73) Assignee: YANMAR CO., LTD., Osaka (JP)

( * ) Notice: Subject to any disclaimer, the term of this patent is extended or adjusted under 35 U.S.C. 154(b) by 105 days.

(21) Appl. No.: 15/475,612

(22) Filed: Mar. 31, 2017

(65) Prior Publication Data

US 2017/0204766 A1 Jul. 20, 2017

Related U.S. Application Data

(63) Continuation of application No. PCT/JP2015/077305, filed on Sep. 28, 2015.

(30) Foreign Application Priority Data

| | | |
|---|---|---|
| Oct. 6, 2014 | (JP) | 2014-205767 |
| Oct. 6, 2014 | (JP) | 2014-205768 |
| Oct. 6, 2014 | (JP) | 2014-205769 |

(51) Int. Cl.
*F01N 3/20* (2006.01)
*F01N 3/28* (2006.01)
(Continued)

(52) U.S. Cl.
CPC ........... *F01N 3/2066* (2013.01); *A01D 41/12* (2013.01); *F01N 3/2892* (2013.01);
(Continued)

(58) Field of Classification Search
CPC ............... F01N 13/008; F01N 2550/05; F01N 2590/08; F01N 2610/02; F01N 3/2066; F01N 3/2892

See application file for complete search history.

(56) References Cited

U.S. PATENT DOCUMENTS 9,624,813 B2 * 4/2017 Winterhoff ............ F01N 13/008
2008/0072576 A1 3/2008 Honda et al.
(Continued)

FOREIGN PATENT DOCUMENTS

| | | |
|---|---|---|
| JP | 3-17122 | 2/1991 |
| JP | 2010-185292 A | 8/2010 |

(Continued)

OTHER PUBLICATIONS

Korean Office Action dated May 21, 2018 issued in corresponding Korean Application No. 10-2017-7007826.

*Primary Examiner* — Audrey K Bradley
*Assistant Examiner* — Anthony Ayala Delgado
(74) *Attorney, Agent, or Firm* — Norton Rose Fulbright US LLP

(57) ABSTRACT

In an engine device having a urea mixing pipe which injects urea water into exhaust gas of an engine, and an SCR case which removes nitrogen oxides in the exhaust gas of the engine, and structured such that an inlet side of the SCR case is connected to an outlet side of the urea mixing pipe, an exhaust gas outlet side of the SCR case is connected to an exhaust gas inlet side of the urea mixing pipe where a urea water injection means is arranged, and an exhaust gas inlet side of the urea mixing pipe is supported to the exhaust gas outlet side of the SCR case.

19 Claims, 24 Drawing Sheets

(51) Int. Cl.
 *F01N 11/00* (2006.01)
 *F01N 13/00* (2010.01)
 *A01D 41/12* (2006.01)

(52) U.S. Cl.
 CPC .......... *F01N 11/007* (2013.01); *F01N 13/008* (2013.01); *F01N 2550/05* (2013.01); *F01N 2560/026* (2013.01); *F01N 2590/08* (2013.01); *F01N 2610/02* (2013.01); *Y02T 10/24* (2013.01)

(56) References Cited

U.S. PATENT DOCUMENTS

| | | |
|---|---|---|
| 2010/0186394 A1 | 7/2010 | Harrison et al. |
| 2012/0017574 A1 | 1/2012 | Hasan et al. |
| 2013/0298655 A1* | 11/2013 | Kowalkowski ......... F01N 11/00 73/114.75 |
| 2014/0290222 A1 | 10/2014 | Sawada et al. |
| 2014/0290781 A1 | 10/2014 | Ozaki et al. |
| 2014/0305110 A1* | 10/2014 | Himoto ................ E02F 9/0833 60/324 |
| 2015/0059457 A1* | 3/2015 | Niaz ..................... F01N 3/2892 73/114.71 |
| 2015/0061286 A1 | 3/2015 | Niaz |
| 2015/0064072 A1 | 3/2015 | Niaz |
| 2015/0068400 A1 | 3/2015 | Niaz |
| 2015/0071827 A1 | 3/2015 | Niaz |
| 2015/0071838 A1 | 3/2015 | Niaz |
| 2015/0075122 A1 | 3/2015 | Niaz |
| 2015/0086433 A1 | 3/2015 | Niaz |
| 2015/0101311 A1 | 4/2015 | Keen et al. |
| 2015/0167520 A1 | 6/2015 | Niaz |

FOREIGN PATENT DOCUMENTS

| | | |
|---|---|---|
| JP | 4605205 B2 | 10/2010 |
| JP | 4703260 B2 | 3/2011 |
| JP | 2012-71743 A | 4/2012 |
| JP | 5020185 B2 | 6/2012 |
| JP | 2012-215022 A | 11/2012 |
| JP | 5543673 B1 | 7/2014 |
| JP | 2014-169071 A | 9/2014 |
| KR | 10-2008-0048769 A | 6/2008 |
| WO | 2013160633 A1 | 10/2013 |

* cited by examiner

ENGINE DEVICE

CROSS-REFERENCE TO RELATED APPLICATIONS

The present application is a continuation application of International Application No. PCT/JP2015/077305, filed Sep. 28, 2015, which claims priority to Japanese Patent Application No. 2014-205767, filed Oct. 6, 2014, Japanese Patent Application No. 2014-205768, filed Oct. 6, 2014 and Japanese Patent Application No. 2014-205769, filed Oct. 6, 2014. The contents of these applications are incorporated herein by reference in their entirety.

BACKGROUND OF THE INVENTION

The present invention relates to an engine device.

There has been conventionally known a technique of purifying the exhaust gas discharged from the diesel engine by arranging a case inward provided with a diesel particulate filter (hereinafter, refer to as a DPF case), and a case inward provided with a urea selective reducing type catalyst (hereinafter, refer to as an SCR case), as an exhaust gas purification device (an exhaust gas aftertreatment device) in an exhaust channel of the diesel engine, and introducing the exhaust gas to the DPF case and the SCR case (refer, for example, to Japanese Patent No. 4703260, Japanese Patent No. 4605205 and Japanese Patent No. 5020185).

SUMMARY OF THE INVENTION

In the structure which is provided with an exhaust gas connection pipe mixing urea water into the exhaust gas, and in which an exhaust gas inlet of an SCR case is connected to an exhaust gas connection pipe, such as the prior art, the exhaust gas connection pipe can be easily assembled in close vicinity to the SCR case. Further, in the structure in which a urea water injection portion is formed in the exhaust gas connection pipe, it is not necessary to specially install the urea water injection portion, and it is possible to simplify an attaching structure of the urea water injection portion.

However, in the structure in which the urea water injection portion is installed in the exhaust gas connection pipe, the urea water injection portion tends to be damaged by the oscillation of the engine, so that there is a problem that it is necessary to reduce the oscillation of the urea water injection portion by enhancing a quakeproofing performance of the urea water injection portion or improving a rigidity of the SCR case.

Further, in the structure in which the urea water injection portion is installed in the exhaust gas connection pipe, a urea water supply hose or an electric wiring tends to fall down or be disconnected due to the oscillation of the engine in the case that the urea water supply hose or the electric wiring connected to the urea water injection body is supported to the main machine side, so that there is a problem that it is impossible to improve a durability of the urea water supply hose or the electric wiring and it is impossible to simplify an attaching structure of the urea water supply hose or the electric wiring.

Further, in the case of being provided with an NOx sensor which detects nitrogen oxides included in the exhaust gas within the SCR case, measurement of an amount of nitrogen oxides becomes improper in the structure in which the NOx sensor detects the exhaust gas in an exhaust gas accumulation portion in an exhaust gas outlet of the cylindrical SCR case, and the NOx sensor can not be compactly installed in the structure in which the NOx sensor protrudes out of an outer peripheral surface of the cylindrical SCR case in an outer diameter direction (a radial direction).

Accordingly, the present invention is going to provide an engine device to which an improvement is applied by making a study of these actual condition.

In order to achieve the object mentioned above, an engine device according to the present invention is an engine device having a urea mixing pipe which injects urea water into exhaust gas of an engine, and an SCR case which removes nitrogen oxides in the exhaust gas of the engine, and structured such that an inlet side of the SCR case is connected to an outlet side of the urea mixing pipe, wherein an exhaust gas outlet side of the SCR case is connected to an exhaust gas inlet side of the urea mixing pipe where a urea water injection means is arranged, and the exhaust gas inlet side of the urea mixing pipe is supported to the exhaust gas outlet side of the SCR case.

The engine device may be structured such that a mixing pipe support body and a support stay body detachably connected are provided, the mixing pipe support body is connected to the exhaust gas inlet side of the urea mixing pipe, and the support stay body is connected to the exhaust gas outlet side of the SCR case.

The engine device may be structured such that an exhaust gas inlet side of the SCR case is firmly fixed integrally to an exhaust gas outlet side of the urea mixing pipe, a urea water injection portion is provided in the exhaust gas inlet side of the urea mixing pipe, and the mixing pipe support body is firmly fixed integrally to an outer peripheral surface of the urea water injection portion where the urea water injection means is arranged.

The engine device may be structured such that an exhaust pipe is fastened and fixed to the exhaust gas outlet side of the SCR case via the support stay body.

Further, an engine device according to the present invention is an engine device having a urea mixing pipe which injects urea water into exhaust gas of an engine, and an SCR case which removes nitrogen oxides in the exhaust gas of the engine, and structured such that an exhaust gas inlet side of the SCR case is connected to an exhaust gas outlet side of the urea mixing pipe, wherein a urea water injection body is arranged in the exhaust gas inlet side of the urea mixing pipe which is connected to the exhaust gas outlet side of the SCR case by a support member, and a urea water supply hose connected to the urea water injection body is firmly fixed to the support member by a clamp member.

The engine device may be structured such that the support member is formed by a mixing pipe support body and a support stay body which are detachably connected, the mixing pipe support body is connected to the exhaust gas inlet side of the urea mixing pipe, the support stay body is connected to the exhaust gas outlet side of the SCR case, and the urea water supply hose is supported to the mixing pipe support body via the clamp member.

The engine device may be structured such that the urea water injection portion is provided in the exhaust gas inlet side of the urea mixing pipe, the urea water injection body is arranged in the urea water injection portion, and the mixing pipe support body is firmly fixed integrally to the urea water injection portion.

The engine device may be structured such that a sensor bracket is firmly fixed to the mixing pipe support body, and the clamp member or a wiring connector is arranged in the sensor bracket.

An engine device according to the present invention is an engine device having a urea mixing pipe which injects urea water into exhaust gas of an engine, and an SCR case which removes nitrogen oxides in the exhaust gas of the engine, and structured such that an exhaust gas inlet side of the SCR case is connected to an exhaust gas outlet side of the urea mixing pipe, wherein an NOx sensor detecting the nitrogen oxides included in the exhaust gas within the SCR case is provided, a tapered taper portion having a frustum shape is formed in the exhaust gas outlet side of the SCR case, and the NOx sensor is attached to the tapered taper portion.

The engine device may be structured such that an exhaust gas inlet is formed in an outer peripheral surface in one end side of the SCR case, the exhaust gas inlet side of the SCR case is integrally connected to the exhaust gas outlet side of the urea mixing pipe, an exhaust gas outlet is formed in an end surface in the other end side of the SCR case, and the exhaust gas inlet side of the urea mixing pipe is connected to the exhaust gas outlet side of the SCR case via a support member.

The engine device may be structured such that the tapered taper portion is formed by an outlet side lid body, the SCR case has an inner case and an outer case, an exhaust gas inlet side of the inner case is closed by an inlet side lid body, an exhaust gas outlet side of the inner case is closed by the outlet side lid body, and the outer case is outward installed to an outer peripheral side of the inner case between the inlet side lid body and the outlet side lid body.

The engine device may be structured such that a spacer body maintaining a distance between an outer peripheral surface of the inner case and an inner peripheral surface of the outer case fixed is provided, and the outer case is integrally connected to the outer peripheral side of the inner case via the spacer body.

According to the embodiment of the present invention, the exhaust gas outlet side of the SCR case is connected to the exhaust gas inlet side of the urea mixing pipe where the urea water injection means is arranged, and the exhaust gas inlet side of the urea mixing pipe is supported to the exhaust gas outlet side of the SCR case. As a result, it is possible to improve a support rigidity in the exhaust gas inlet side of the urea mixing pipe on the basis of the connection to the exhaust gas outlet side of the SCR case, it is possible to suppress a mechanical oscillation and it is possible to reduce damage of the urea water injection means. It is possible to achieve a weight saving without necessity of increase in rigidity of the urea mixing pipe or the SCR case. It is possible to achieve a parts number reduction or a manufacturing cost reduction of the urea mixing pipe attaching structure by applying a piping function to the exhaust gas outlet side of the SCR case.

According to the embodiment of the present invention, the mixing pipe support body and the support stay body detachably connected are provided, the mixing pipe support body is connected to the exhaust gas inlet side of the urea mixing pipe, and the support stay body is connected to the exhaust gas outlet side of the SCR case. As a result, it is possible to absorb an attaching dimensional error in the exhaust gas inlet side of the urea mixing pipe on the basis of the connection adjustment between the mixing pipe support body and the support stay body, it is possible to improve an attaching workability of the urea mixing pipe, and it is possible to improve a piping workability for connecting to the exhaust gas inlet side of the urea mixing pipe.

According to the embodiment of the present invention, the exhaust gas inlet side of the SCR case is firmly fixed integrally to the exhaust gas outlet side of the urea mixing pipe, the urea water injection portion is provided in the exhaust gas inlet side of the urea mixing pipe, and the mixing pipe support body is firmly fixed integrally to the outer peripheral surface of the urea water injection portion where the urea water injection means is arranged. As a result, it is possible to support the exhaust gas inlet side of the urea mixing pipe in a quakeproofing manner, it is possible to reduce the oscillation of the urea water injection portion where the urea water injection means is arranged, and it is possible to improve the durability of the urea water injection portion.

According to the embodiment of the present invention, the exhaust pipe is fastened and fixed to the exhaust gas outlet side of the SCR case via the support stay body. As a result, the support stay body can be attached to the SCR case by using bolts for fastening the exhaust pipe to the SCR case in common. It is possible to apply the connection function of the exhaust pipe to the support stay body, and it is possible to reduce the manufacturing cost by reducing the constituting parts number.

According to the embodiment of the present invention, the urea water injection body is arranged in the exhaust gas inlet side of the urea mixing pipe which is connected to the exhaust gas outlet side of the SCR case by the support member, and the urea water supply hose connected to the urea water injection body is firmly fixed to the support member by the clamp member. As a result, it is possible to simplify the support structure such as the urea water supply hose or the harness by making good use of the support member while it is possible to reduce the damage of the urea water supply hose caused by the mechanical oscillation, and it is possible to achieve the parts number reduction or the manufacturing cost reduction of the attaching structure such as the urea water supply hose or the harness.

According to the embodiment of the present invention, the support member is formed by the mixing pipe support body and the support stay body which are detachably connected, the mixing pipe support body is connected to the exhaust gas inlet side of the urea mixing pipe, the support stay body is connected to the exhaust gas outlet side of the SCR case, and the urea water supply hose is supported to the mixing pipe support body via the clamp member. As a result, the mixing pipe support body can be firmly fixed to the urea mixing pipe according to a simple processing work such as a welding process, it is possible to improve an assembling workability by reducing assembly parts of the urea mixing pipe, and it is possible to improve a piping workability for connecting to the exhaust gas inlet side of the urea mixing pipe.

According to the embodiment of the present invention, the urea water injection portion is provided in the exhaust gas inlet side of the urea mixing pipe, the urea water injection body is arranged in the urea water injection portion, and the mixing pipe support body is firmly fixed integrally to the urea water injection portion. As a result, it is possible to mutually improve an attaching rigidity to the urea water injection body of the urea water injection portion and a connecting rigidity of the mixing pipe support body, it is possible to support the exhaust gas inlet side of the urea mixing pipe in a quakeproofing manner, and the urea water injection portion can be constructed as a structure which is excellent in durability.

According to the embodiment of the present invention, the sensor bracket is firmly fixed to the mixing pipe support body, and the clamp member or the wiring connector is arranged in the sensor bracket. As a result, in spite that the exhaust gas inlet side of the urea mixing pipe can be achieved as the structure which is excellent in the durability by adding a clamp function of the urea water supply hose or the wiring connector to the structure supporting the urea water injection body in the quakeproofing manner, it is possible to reduce the manufacturing cost by reducing the constituting parts number in the exhaust gas inlet side of the urea mixing pipe.

According to the embodiment of the present invention, the tapered taper portion having the frustum shape is formed in the exhaust gas outlet side of the SCR case, and the NOx sensor is attached to the tapered taper portion. As a result, it is possible to do away with such a problem that the gas accumulation part is formed in a cylindrical corner portion in the exhaust gas outlet side of the SCR case in comparison with the structure in which the exhaust gas outlet side of the SCR case is formed into the cylindrical shape, it is possible to smoothly move the exhaust gas from the exhaust gas outlet side of the SCR case toward the exhaust pipe connected to the portion, and it is possible to properly measure an amount of nitrogen oxides in the exhaust gas in the exhaust gas outlet side of the SCR case. Further, the NOx sensor can be supported while being inclined to a center line in the exhaust gas moving direction of the SCR case, an NOx sensor leading end portion can be protruded toward a catalyst center portion in the inner portion in the exhaust gas outlet side of the SCR case, it is possible to improve a precision for measuring the amount of nitrogen oxides, it is possible to form a base end side protruding dimension of the NOx sensor protruded out of the outer peripheral side of the SCR case toward an outer diameter direction short, and it is possible to structure an outer dimension of the SCR case compactly.

According to the embodiment of the present invention, the exhaust gas inlet is formed in the outer peripheral surface in one end side of the SCR case, the exhaust gas inlet side of the SCR case is integrally connected to the exhaust gas outlet side of the urea mixing pipe, the exhaust gas outlet is formed in the end surface in the other end side of the SCR case, and the exhaust gas inlet side of the urea mixing pipe is connected to the exhaust gas outlet side of the SCR case via the support member. As a result, the exhaust gas can be supplied to the internal portion in one end side of the SCR case while being diffused, it is possible to effectively work an action of purifying the SCR catalyst for reducing the urea selective catalyst which is inward provided in the SCR case, it is possible to improve the exhaust gas purifying function of the SCR case, it is possible to smoothly discharge the exhaust gas out of the other end side of the SCR case, and it is possible to reduce the exhaust gas resistance of the SCR case.

According to the embodiment of the present invention, the tapered taper portion is formed by the outlet side lid body, the SCR case has the inner case and the outer case, the exhaust gas inlet side of the inner case where the SCR catalyst for reducing the urea selective catalyst is inward provided is closed by the inlet side lid body, the exhaust gas outlet side of the inner case is closed by the outlet side lid body, and the outer case is outward installed to the outer peripheral side of the inner case between the inlet side lid body and the outlet side lid body. As a result, it is possible to easily maintain a temperature of the exhaust gas and the SCR catalyst within the inner case to be equal to or higher than a predetermined temperature, and it is possible to improve the exhaust gas purifying function of the SCR case. Further, in the case that the inner case or the outer case is formed by a pipe which is obtained by bending a metal plate into a cylindrical shape, it is possible to easily secure a strength which is necessary for inward supporting the SCR catalyst even if the inner case or the outer case is formed with thin pipe thickness, and it is possible to achieve the weight saving or the manufacturing cost reduction of the SCR case.

According to the embodiment of the present invention, the spacer body maintaining the distance between the outer peripheral surface of the inner case and the inner peripheral surface of the outer case fixed is provided, and the outer case is integrally connected to the outer peripheral side of the inner case via the spacer body. As a result, it is possible to easily improve the rigidity of the cylindrical structure which is formed by the inner case and the outer case, it is possible to reduce deformation and damage of the inner case or the outer case, it is possible to save weight of the SCR case, and it is possible to reduce the manufacturing cost of the SCR case.

DESCRIPTION OF THE EMBODIMENTS

Figure 1:
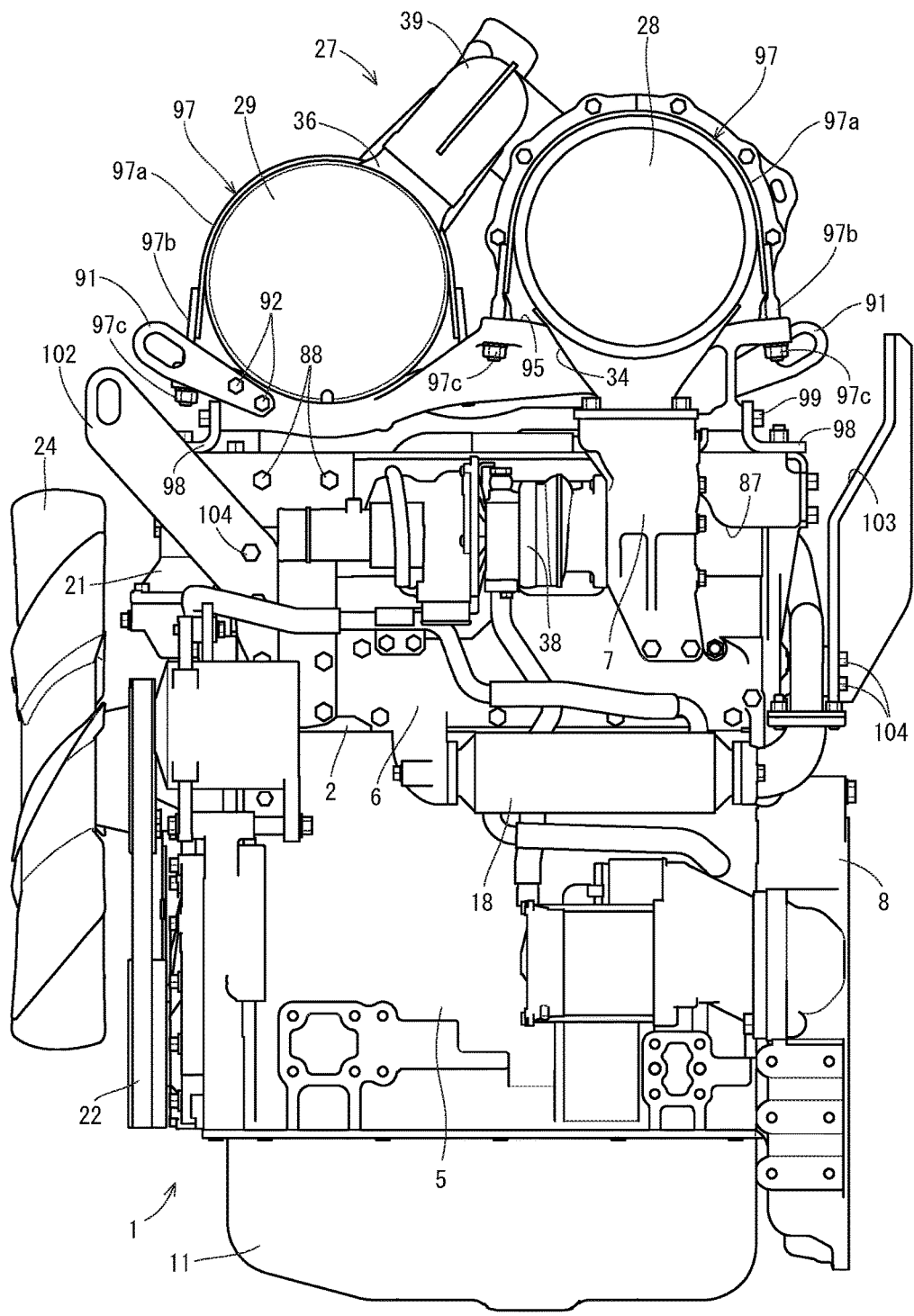
FIG. 1 is a left side elevational view of a diesel engine and shows a first embodiment.
Figure 2:
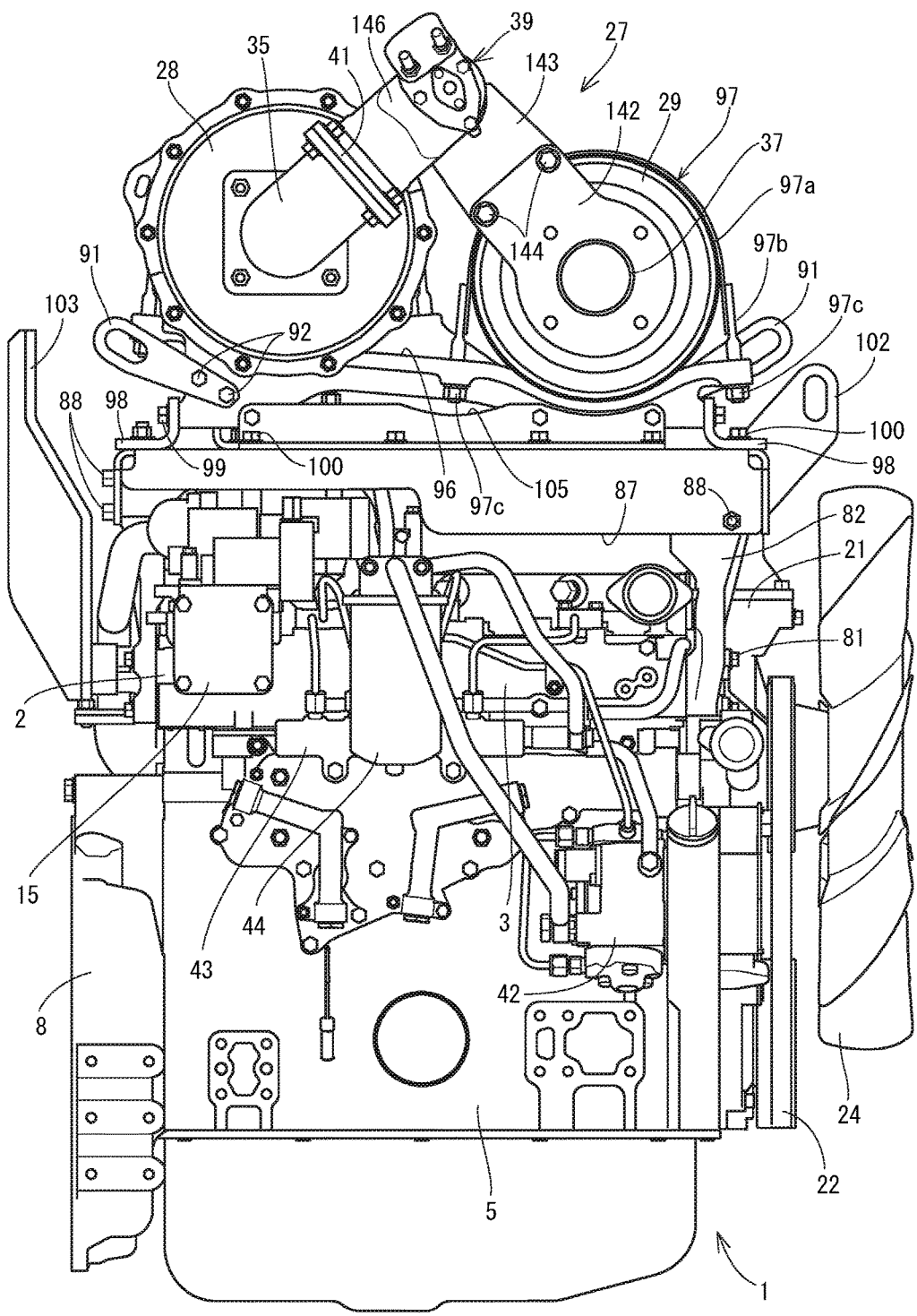
FIG. 2 is a right side elevational view of the same.
Figure 3:
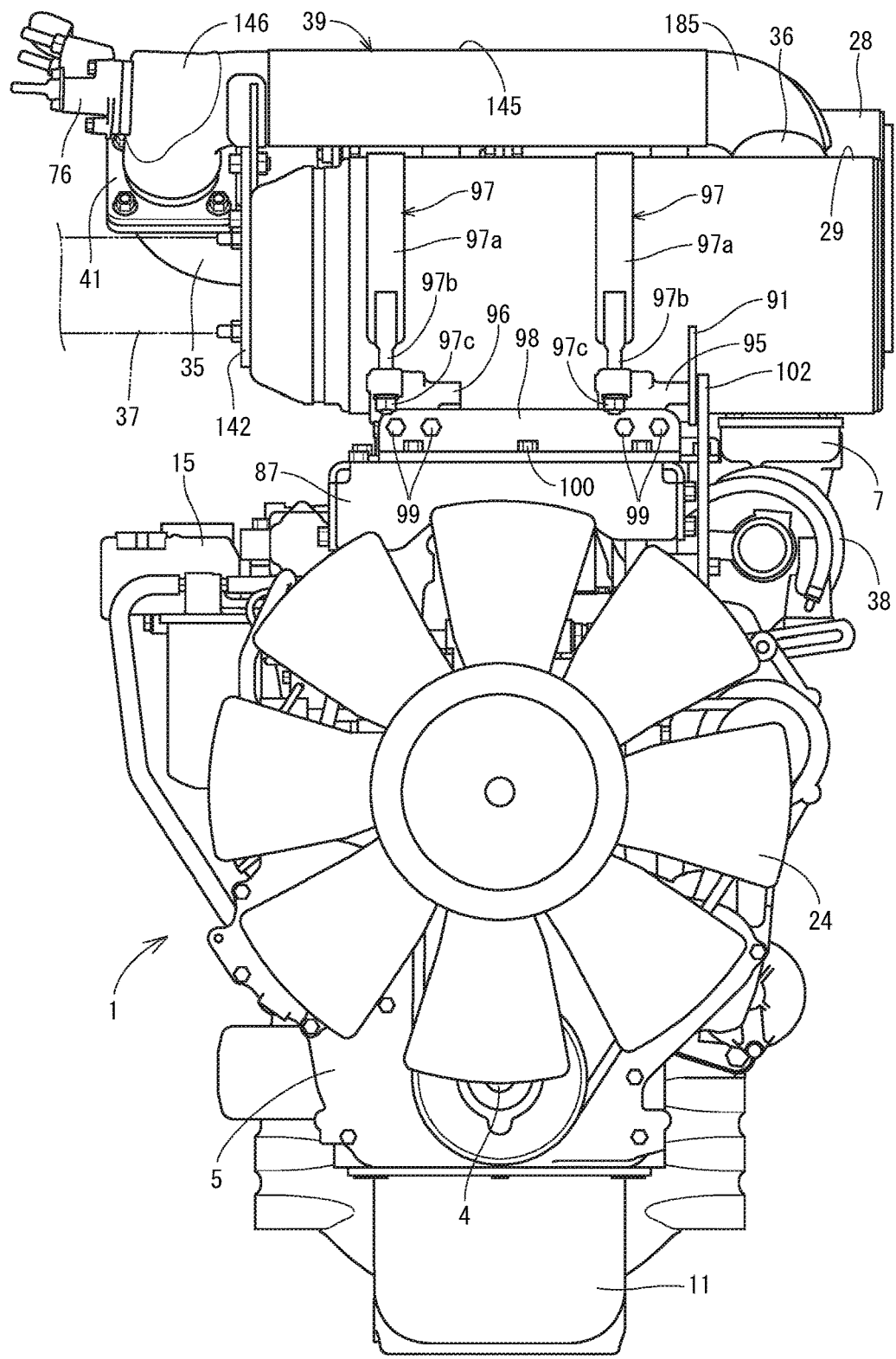
FIG. 3 is a front elevational view of the same.

A description will be given below of a first embodiment obtained by embodying the present invention with reference to the accompanying drawings (FIGS. 1 to 20). FIG. 1 is a left side elevational view of a diesel engine 1 in which an exhaust gas manifold 6 is installed, FIG. 2 is a right side elevational view of the diesel engine 1 in which an intake air manifold 3 is installed, and FIG. 3 is a front elevational view of the diesel engine 1 in which a cooling fan 24 is installed. A side in which the exhaust gas manifold 6 is installed is called as a left side surface of the diesel engine 1, a side in which the intake air manifold 3 is installed is called as a right side surface of the diesel engine 1, and a side in which the cooling fan 24 is installed is called as a front surface of the diesel engine 1.

A description will be given of a whole structure of the diesel engine 1 with reference to FIGS. 1 to 5. As shown in FIGS. 1 to 5, an intake air manifold 3 is arranged in one side surface of a cylinder head 2 of a diesel engine 1. The cylinder head 2 is mounted on a cylinder block 5 which has an engine output shaft 4 (a crank shaft) and a piston (not shown) built-in. An exhaust gas manifold 6 is arranged in the other side surface of the cylinder head 2. A front end and a rear end of the engine output shaft 4 are protruded out of a front surface and a back surface of the cylinder block 5.

As shown in FIGS. 1 to 5, a flywheel housing 8 is firmly fixed to the back surface of the cylinder block 5. A flywheel 9 is provided within the flywheel housing 8. The flywheel 9 is axially supported to the rear end side of the engine output shaft 4. Power of the diesel engine 1 is adapted to be taken out via the flywheel 9. Further, a sump 11 is arranged in a lower surface of the cylinder block 5.

As shown in FIGS. 2 to 5, an exhaust gas recirculation device (EGR) 15 taking into exhaust gas for recirculation is arranged in the intake air manifold 3. An air cleaner 16 (refer to FIG. 21) is connected to the intake air manifold 3. External air which is dust removed and purified by the air cleaner 16 is adapted to be fed to the intake air manifold 3, and be supplied to each of cylinders of the diesel engine 1.

According to the above structure, the exhaust gas discharged out of the diesel engine 1 to the exhaust gas manifold 6 is partly reflowed to each of the cylinders of the diesel engine 1 from the intake air manifold 3 via the exhaust gas recirculation device 15. As a result, a combustion temperature of the diesel engine 1 is lowered, a discharge amount of nitrogen oxides (NOx) from the diesel engine 1 is lowered, and a fuel consumption of the diesel engine 1 is improved.

Figure 21:
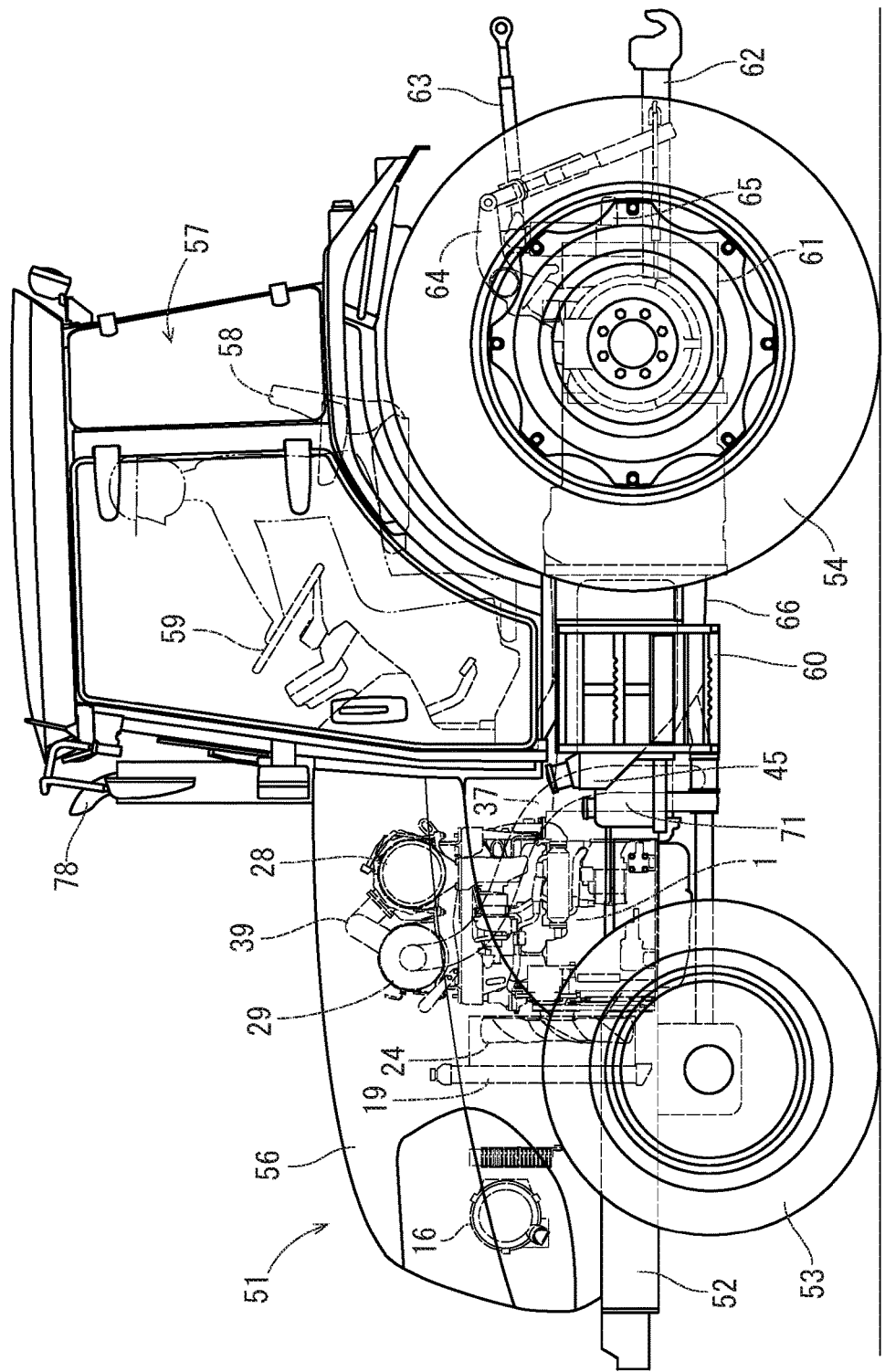
FIG. 21 is a left side elevational view of a tractor which mounts a diesel engine thereto.

A cooling water pump 21 is provided for circulating cooling water within the cylinder block 5 and in a radiator 19 (refer to FIG. 21). The cooling water pump 21 is arranged in a side where a cooling fan 24 is installed in the diesel engine 1. The cooling water pump 21 and the cooling fan 24 are coupled to the engine output shaft 4 via a V-belt 22, and the cooling water pump 21 and the cooling fan 24 are driven. The cooling water is fed into the cylinder block 5 from the cooling water pump 21 via an EGR cooler 18 of the exhaust gas recirculation device 15, and the diesel engine 1 is adapted to be cooled by a wind of the cooling fan 24.

Figure 4:
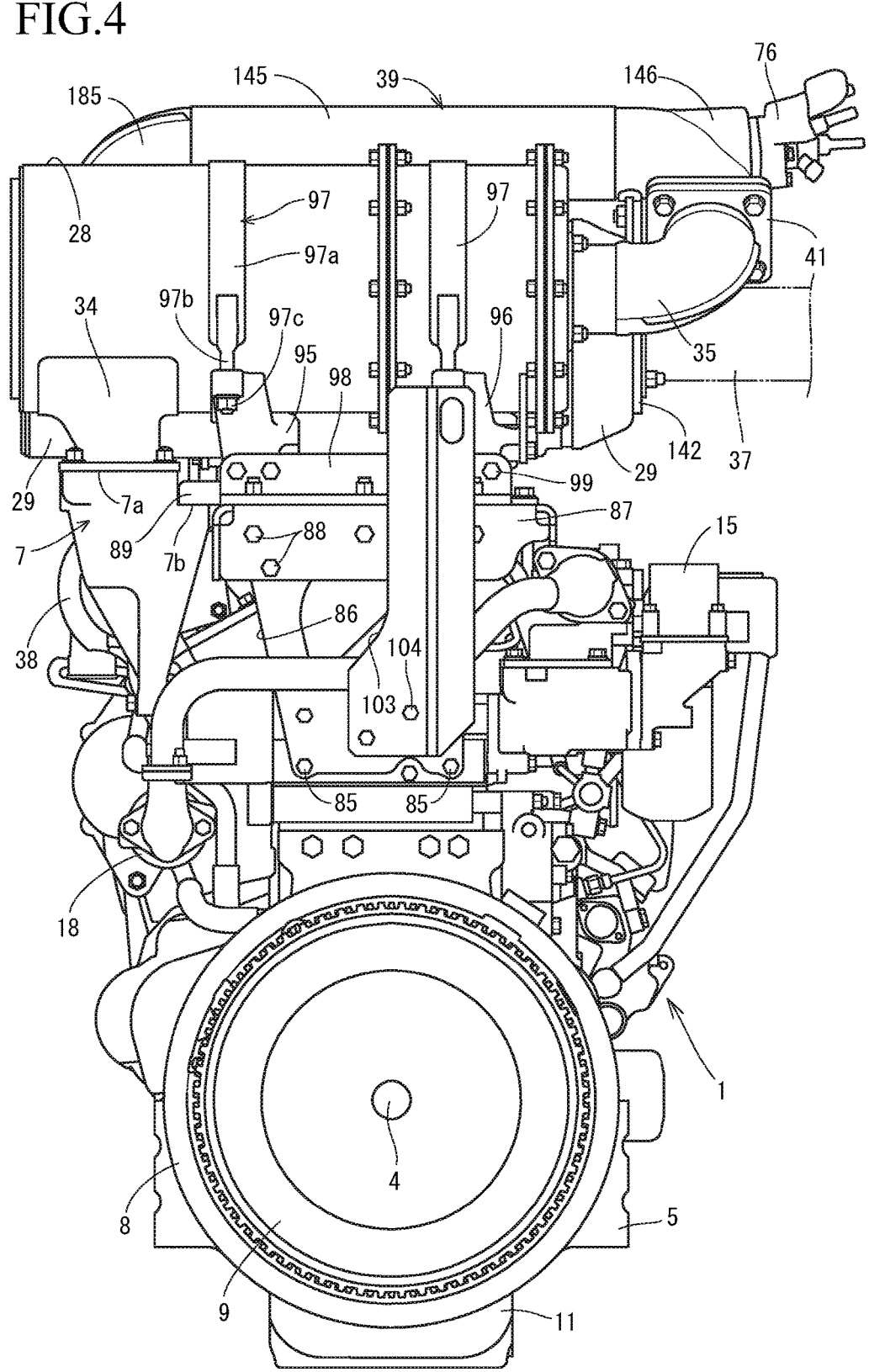
FIG. 4 is a back elevational view of the same.
Figure 5:
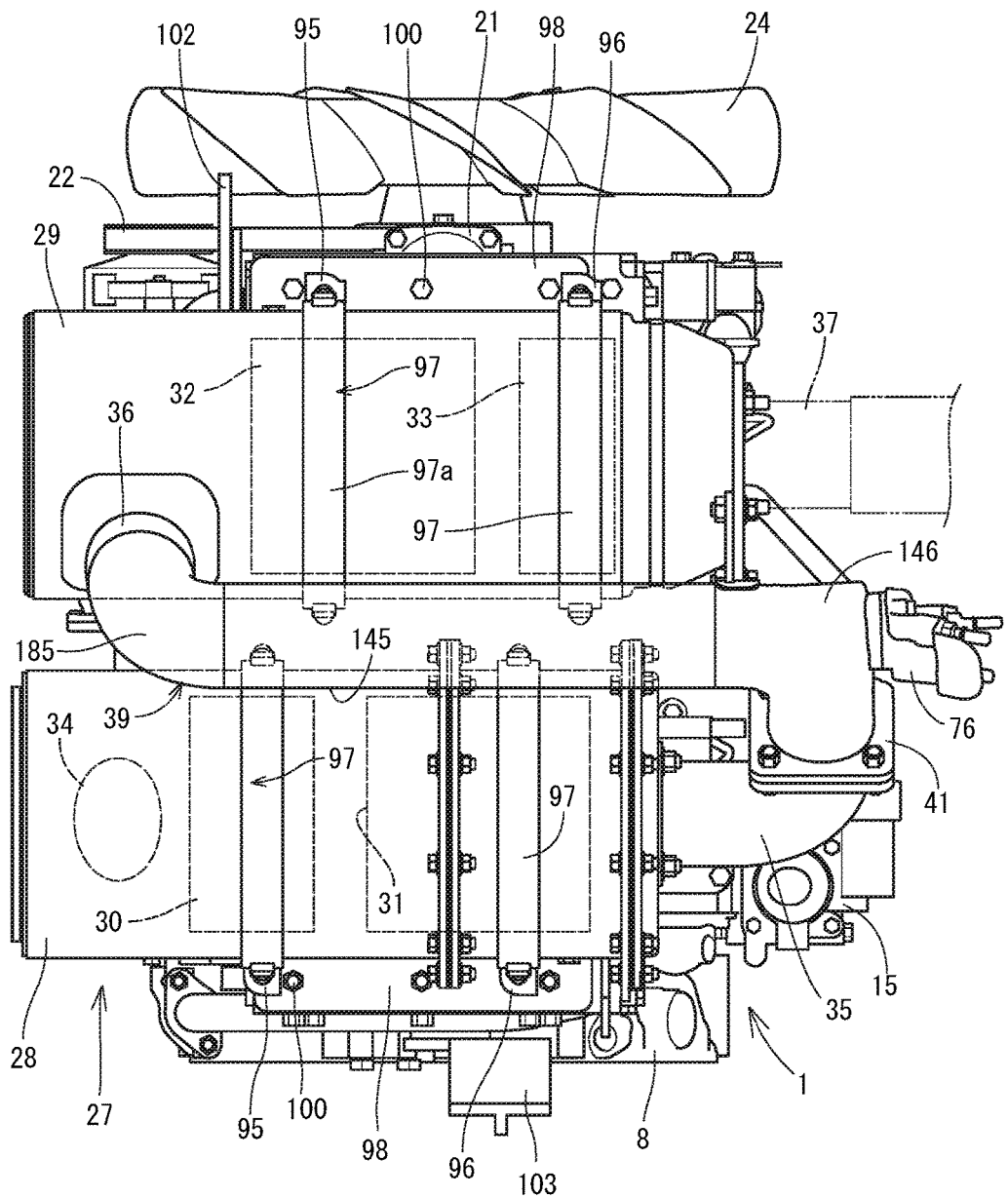
FIG. 5 is a plan view of the same.
Figure 6:
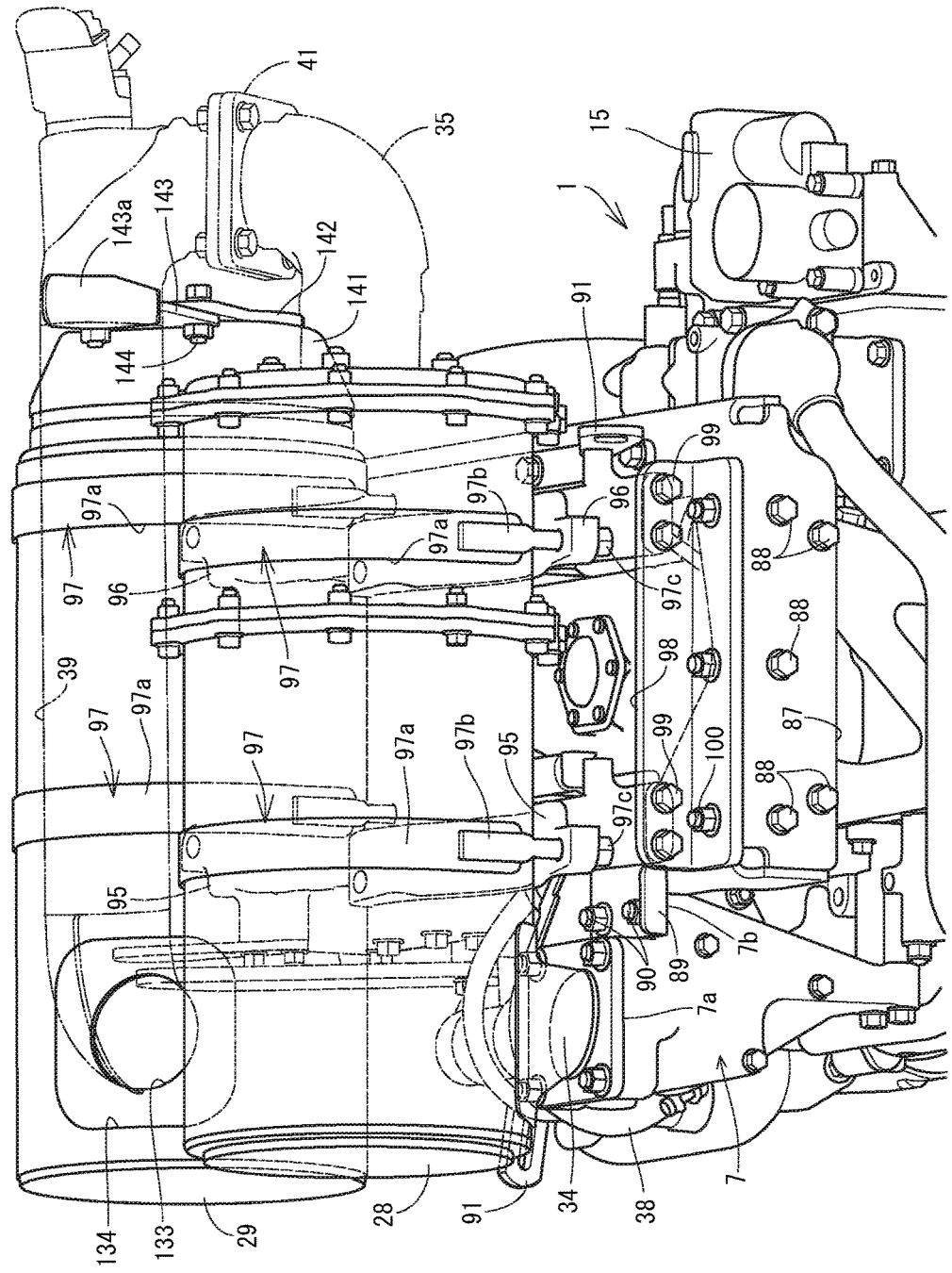
FIG. 6 is an explanatory view in a back elevational view of an upper portion of the same in a state in which an exhaust gas purification device is attached.
Figure 7:
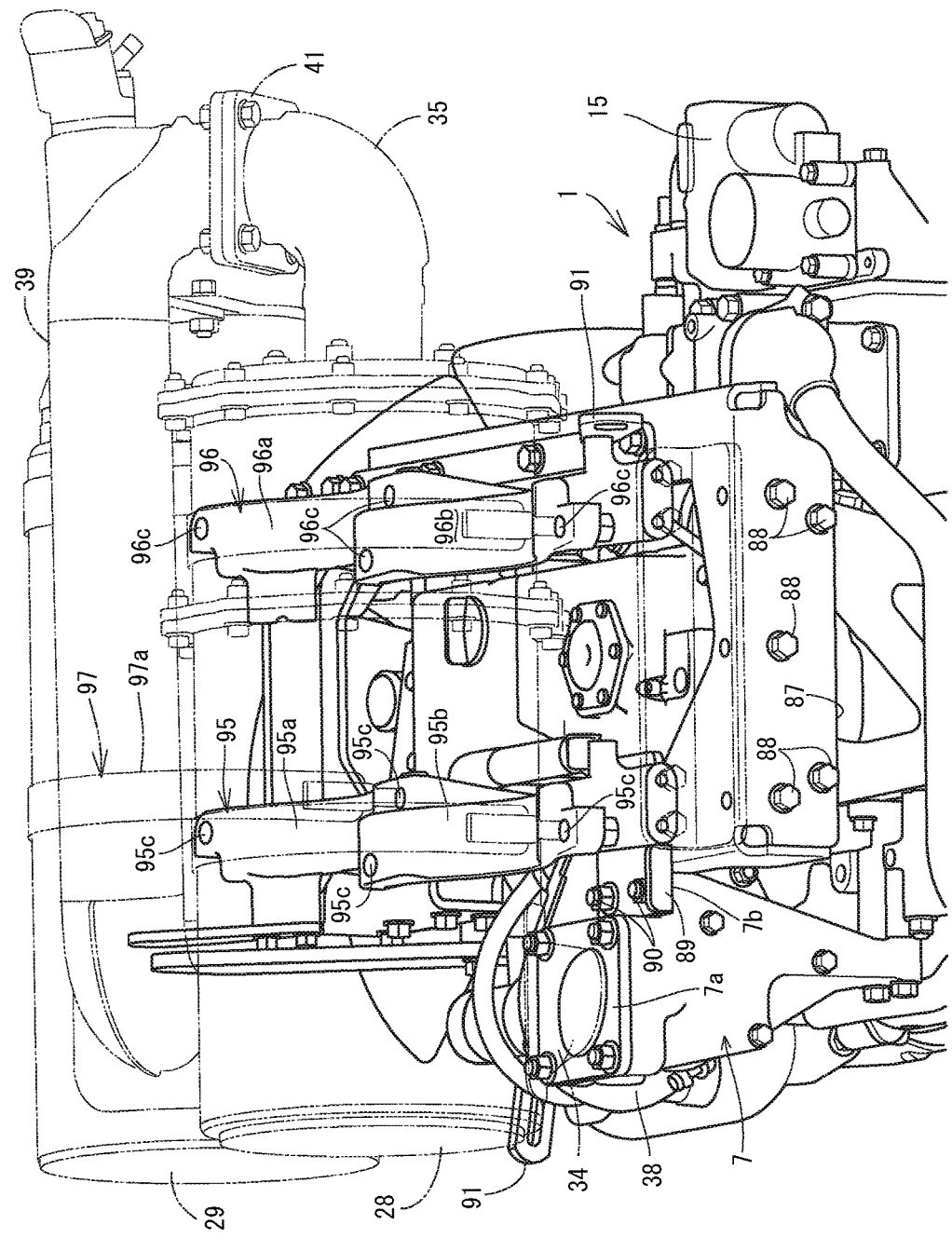
FIG. 7 is an explanatory view in a back elevational view of the upper portion of the same in a state in which the exhaust gas purification device is detached.
Figure 8:
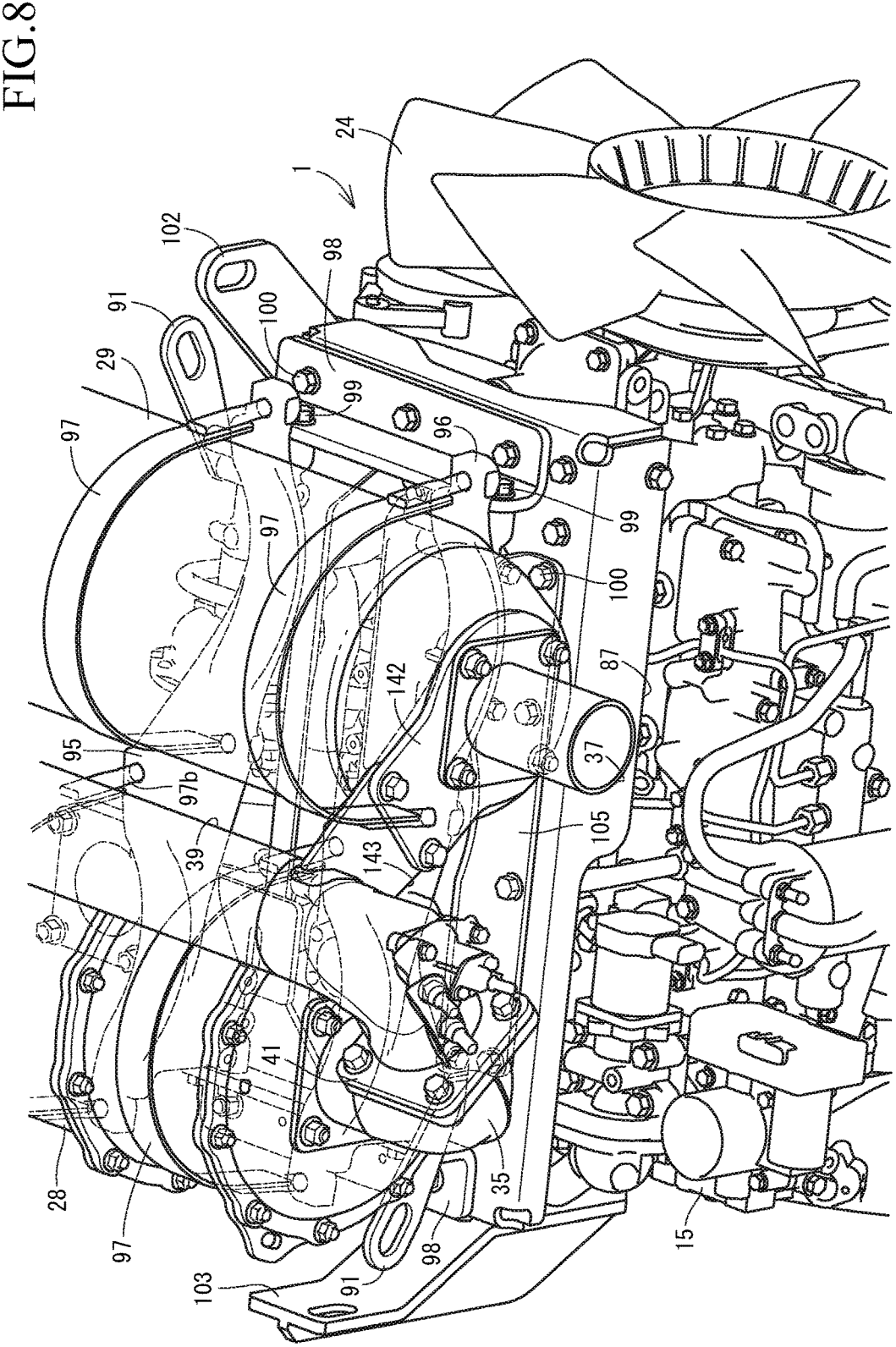
FIG. 8 is an explanatory view in a right side elevational view of the upper portion of the same in a state in which the exhaust gas purification device is attached.
Figure 9:
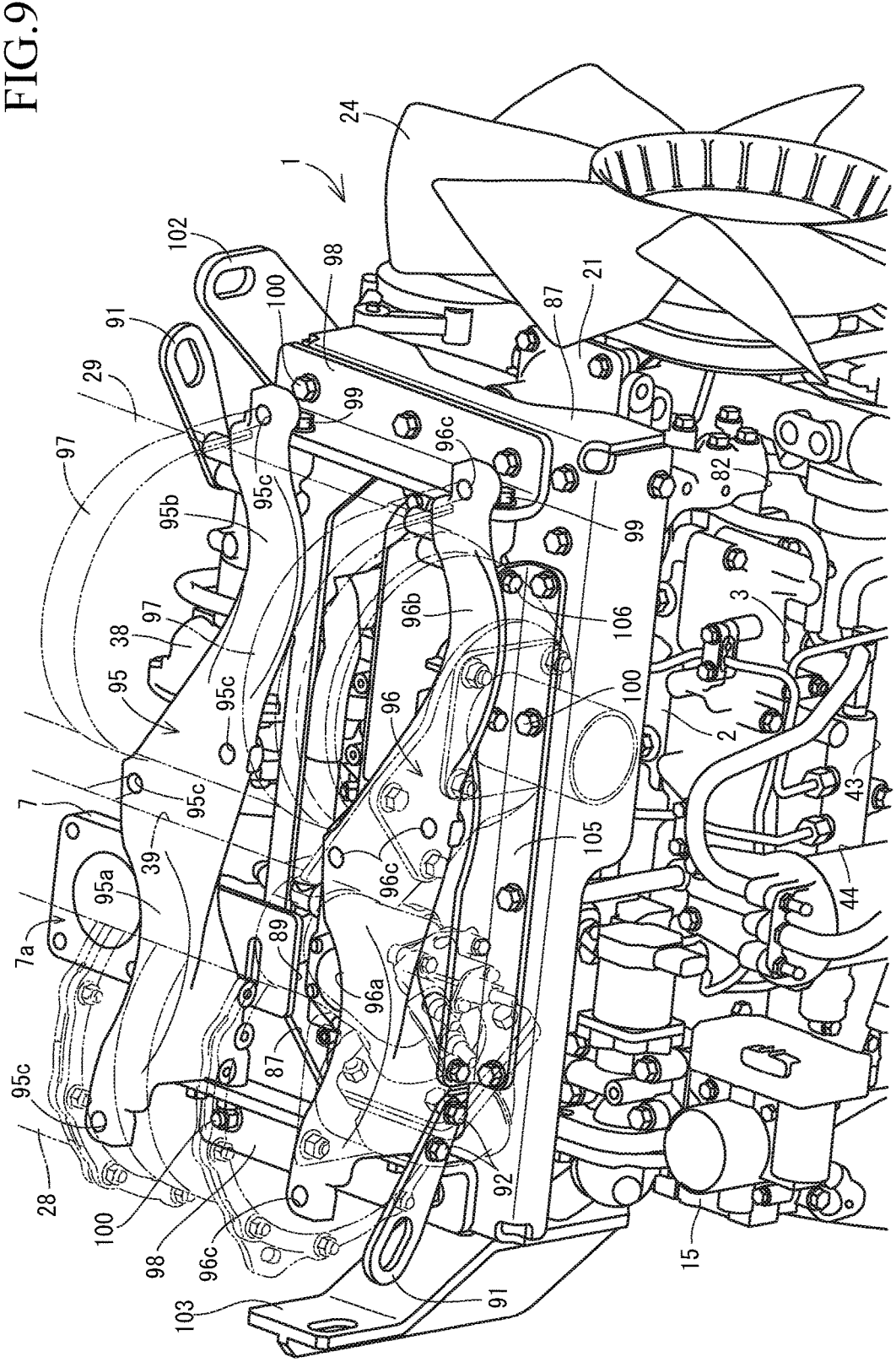
FIG. 9 is an explanatory view in a right side elevational view of the upper portion of the same in a state in which the exhaust gas purification device is detached.
Figure 10:
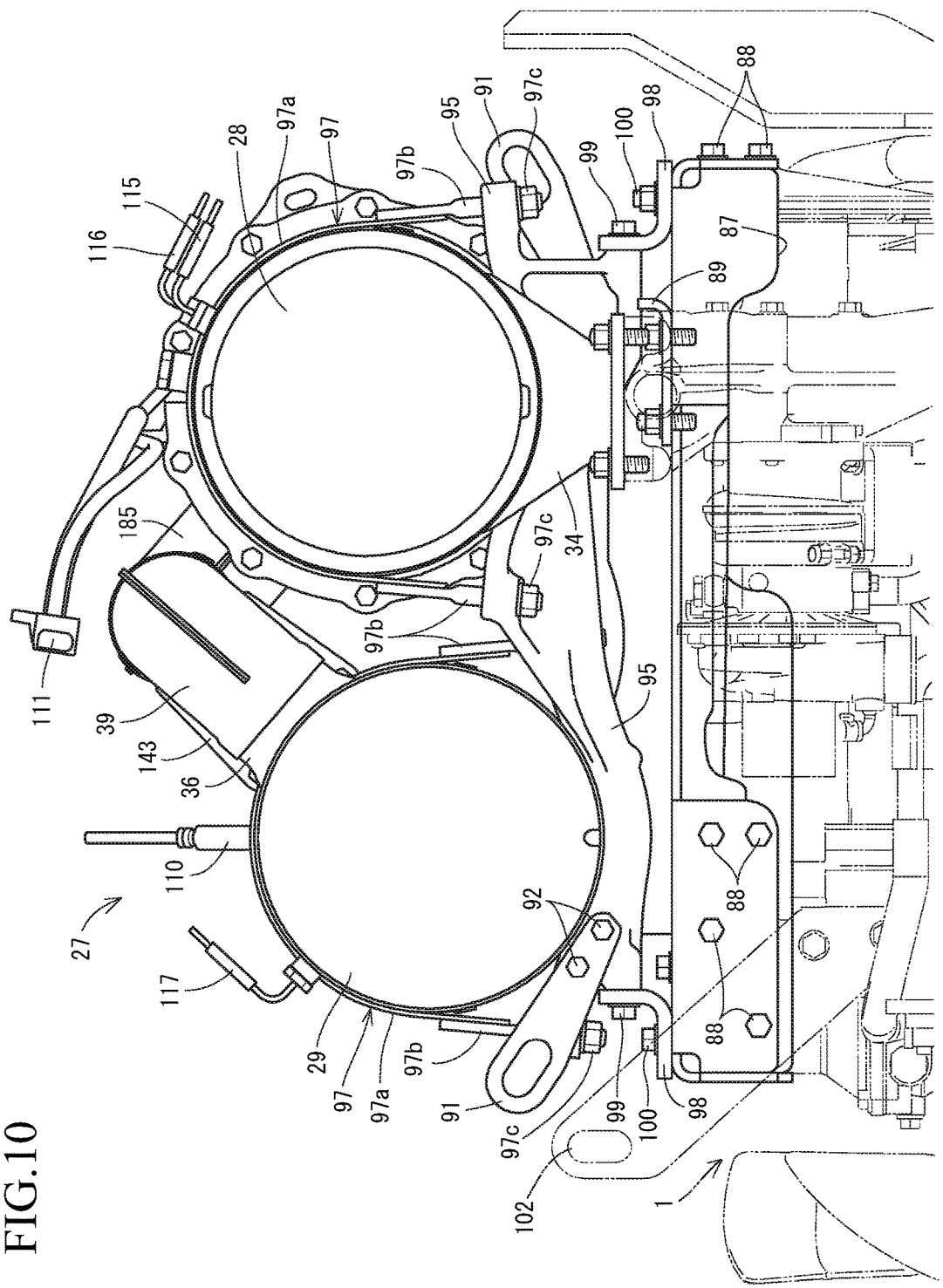
FIG. 10 is a left side elevational view of the exhaust gas purification device.

As shown in FIGS. 1 to 5, as an exhaust gas purification device 27 for purifying the exhaust gas discharged out of the cylinders of the diesel engine 1, there are provided a first case 28 serving as a diesel particulate filter (DPF) which removes particulate matters in the exhaust gas of the diesel engine 1, and a second case 29 serving as a urea selective catalyst reducing (SCR) system which removes nitrogen oxides in the exhaust gas of the diesel engine 1. As shown in FIG. 5, an oxidation catalyst 30 and a soot filter 31 are inward provided in the first case 28 serving as the DPF case. An SCR catalyst 32 for reducing the urea selective catalyst and an oxidation catalyst 33 are inward provided in the second case 29 serving as the SCR case.

The exhaust gas discharged out of the cylinders of the diesel engine 1 to the exhaust gas manifold 6 is discharged outward via the exhaust gas purification device 27. The exhaust gas purification device 27 is adapted to reduce carbon monoxide (CO), carbon hydride (HC), particulate matters (PM), and nitrogen oxides (NOx) in the exhaust gas of the diesel engine 1.

As shown in FIGS. 3 to 5, the first case 28 and the second case 29 are formed into a long cylindrical shape which extends long in an orthogonal direction intersecting the output shaft (the crank shaft) 4 of the diesel engine 1 in a plan view. A DPF inlet pipe 34 taking into the exhaust gas, and a DPF outlet pipe 35 discharging the exhaust gas are provided in both sides (one end side and the other end side in an exhaust gas moving direction) of a tubular shape of the first case 28. In the same manner, an SCR inlet pipe 36 taking into the exhaust gas, and an SCR outlet pipe 37 discharging the exhaust gas are provided in both sides (one end side and the other end side in the exhaust gas moving direction) of the second case 29.

Further, a supercharger 38 forcibly feeding air into the diesel engine 1, and an exhaust gas outlet pipe 7 fastened by bolts to the exhaust gas manifold 6 are arranged in an exhaust gas outlet of the exhaust gas manifold 6. The exhaust gas of the diesel engine 1 is adapted to be introduced into the first case 28 by communicating the DPF inlet pipe 34 with the exhaust gas manifold 6 via the supercharger 38 and the exhaust gas outlet pipe 7. Meanwhile, the exhaust gas of the first case 28 is adapted to be introduced into the second case 29 by connecting the SCR inlet pipe 36 to the DPF outlet pipe 35 via a urea mixing pipe 39 mentioned later. In addition, the DPF outlet pipe 35 and the urea mixing pipe 39 are detachably connected by a DPF outlet side flange body 41 for fastening by bolts. The SCR inlet pipe 36 and the urea mixing pipe 39 are integrally connected by welding process.

As shown in FIG. 2, each of injectors (not shown) for multiple cylinders of the diesel engine 1 is provided with a fuel pump 42 to which a fuel tank 45 shown in FIG. 21 (FIG. 22) is connected and a common rail 43. The common rail 43 and a fuel filter 44 are arranged in a side where the intake air manifold 3 is installed in the cylinder head 2, and the fuel pump 42 is arranged in a cylinder block 5 below the intake air manifold 3. Each of the injectors has an electromagnetic opening and closing control type fuel injection valve (not shown).

The fuel within the fuel tank 45 is sucked into the fuel pump 42 via the fuel filter 44. Meanwhile, the common rail 43 is connected to the discharge side of the fuel pump 42, and the cylindrical common rail 43 is connected to each of the injectors of the diesel engine 1. A surplus of the fuel which is pressure fed to the common rail 43 from the fuel pump 42 is returned to the fuel tank 45, the high-pressure fuel is temporarily stored in the common rail 43, and the high-pressure fuel in the common rail 43 is supplied to an inner portion of each of the cylinders of the diesel engine 1.

According to the structure mentioned above, the fuel in the fuel tank 45 is pressure fed to the common rail 43 by the fuel pump 42, the high-pressure fuel is stored in the common rail 43, and the fuel injection valve in each of the injectors is controlled to be opened and closed. As a result, the high-pressure fuel in the common rail 43 is injected to each of the cylinders in the diesel engine 1. In other words, an injection pressure, an injection timing, and an injection period (an injection amount) of the fuel can be controlled with a high precision by electronically controlling the fuel injection valve in each of the injectors. Therefore, it is possible to reduce the nitrogen oxides (NOx) discharged out of the diesel engine 1.

Further, a description will be given of an attaching structure between the first case 28 and the second case 29 with reference to FIGS. 1 to 14. As shown in FIGS. 2, 4, 13, 17, and 18, there are provided a front portion support leg body 82 which is fastened by bolts 81 its lower end side to a right corner portion in a front surface of the cylinder head 2, a side portion leg body 84 which is fastened by bolts 83 its lower end side to a front corner portion in a left side surface of the cylinder head 2, and a rear portion support leg body 86 which is fastened by bolts 85 its lower end side to a rear surface of the cylinder head 2, and each of the support leg bodies 82, 84, and 86 is provided in a rising manner in the cylinder head 2. A rectangular support base 87 formed by sheet metal processing is provided, and side surfaces and an upper surface side of the support base 87 are fastened by bolts 88 to upper end sides of the support leg bodies 82, 84, and 86. Further, a tabular positioning body 89 is fixed by welding to the upper surface of the support base 87 which is provided in relation to the exhaust gas outlet pipe 7, a flat positioning step portion 7b is formed in the exhaust gas outlet pipe 7 in parallel to the flat exhaust gas outlet surface 7a of the exhaust gas outlet pipe 7 which is opened upwardly, a part of a tabular lower surface of the positioning body 89 is brought into surface contact with the positioning step portion 7b, and the positioning body 89 is fastened to the exhaust gas outlet pipe 7 by positioning bolts 90. The upper surface of the support base 87 is adapted to be approximately horizontal to the diesel engine 1 on the basis of a surface contact between the exhaust gas outlet pipe 7 (the flat upper surface of the positioning step portion 7b) and the flat lower surface of the positioning body 89.

As shown in FIGS. 1 to 14, 17, and 18, a pair of left case fixing body 95 and right case fixing body 96, and four fastening bands 97 having fastening bolts in both end sides are provided as a pinching body arranging the first case 28 and the second case 29 in parallel. The first case 28 is firmly fixed detachably to rear mounting portions 95a and 96a of the left case fixing body 95 and the right case fixing body 96 by a pair of right and left fastening bands 97, and the second case 29 is firmly fixed detachably to front mounting portions 95b and 96b of the left case fixing body 95 and the right case fixing body 96 by a pair of right and left fastening bands 97. Therefore, the cylindrical first case 28 and second case 29 which are long in a lateral direction are arranged in parallel in an upper surface side of the diesel engine 1, the first case 28 is positioned in the upper surface rear side (the rear mounting portions 95a and 96a) of the diesel engine 1, and the second case 29 is positioned in the upper surface front side (the front mounting portions 95b and 96b) of the diesel engine 1. The front mounting portions 95b and 96b are formed in the upper surface side of the diesel engine 1 to be lower than the rear mounting portions 95a and 96a, support heights of the first case 28 and the second case 29 are differentiated, and the urea mixing pipe 39 is supported at a low position of the upper surface of the diesel engine 1, so that the upper surface side height of the diesel engine 1 is adapted to be formable low.

As shown in FIGS. 6 to 14, front and rear support frame bodies 98 are fastened by bolts 99 to front and rear end portions of the left case fixing body 95 and the right case fixing body 96 so as to be adjustable their attachment positions (support attitudes), a side portion support frame body 105 is fastened by bolts 106 to a side surface of the right case fixing body 96 so as to be adjustable its attachment position (support attitude), the left and right case fixing bodies 95 and 96, the front and rear support frame bodies 98, and the side portion support frame body 105 are connected like a quadrangular frame shape, the front and rear support frame bodies 98 and the side portion support frame body 105 are fastened by bolts 100 to the upper surface of the support base 87, and the first case 28 and the second case 29 are firmly fixed to the upper surface of the support base 87 via the left and right case fixing bodies 95 and 96 and the fastening bands 97, thereby constructing the exhaust gas purification device 27 serving as the exhaust gas purification unit.

As shown in FIGS. 6 to 10, four fastening bands 97 are provided as a plurality of pinching bodies. The fastening band 97 has a belt-like fastening band main body 97a, and a fastening bolt 97b which is firmly fixed to both end sides of the fastening band main body 97a. In a state in which the fastening band main body 97a is wound around the first case 28 or the second case 29, a leading end side of the fastening bolt 97b is fitted and inserted to bolt holes 95c and 96c of the left case fixing body 95 and the right case fixing body 96, a fastening nut 97c is threadably attached to the leading end side of the fastening bolt 97b, and the first case 28 is firmly fixed to the rear mounting portions 95a and 96a of the left case fixing body 95 and the right case fixing body 96 via two left and right fastening bands 97. Further, the second case 29 is firmly fixed to the front mounting portions 95b and 96b of the left case fixing body 95 and the right case fixing body 96 via two left and right fastening bands 97, and the first case 28 and the second case 29 which are long in the lateral direction and are formed into the cylindrical shapes are arranged in a sideways falling attitude in the upper surface side of the diesel engine 1.

Further, left and right unit suspension members 91 are fastened by bolts 92 to a front end side of the left case fixing body 95 and a rear end side of the right case fixing body 96, the left and right unit suspension members 91 are arranged at diagonal positions of the quadrangular frame of the left and right case fixing bodies 95 and 96 and the front and rear support frame bodies 98, and the exhaust gas purification device 27 is adapted to be movable in a suspended state via the left and right unit suspension members 91 by using a material handling machine such as a hoist or a chain block. Meanwhile, the diesel engine 1 is structured such as to be movable in a suspended state via the front and rear engine suspension members 102 and 103 by fastening the front and rear engine suspension members 102 and 103 by bolts 104 to the left front portion and the back face portion of the cylinder head 2 in the diesel engine 1, and using a material handling machine such as a hoist or a chain block.

Figure 15:
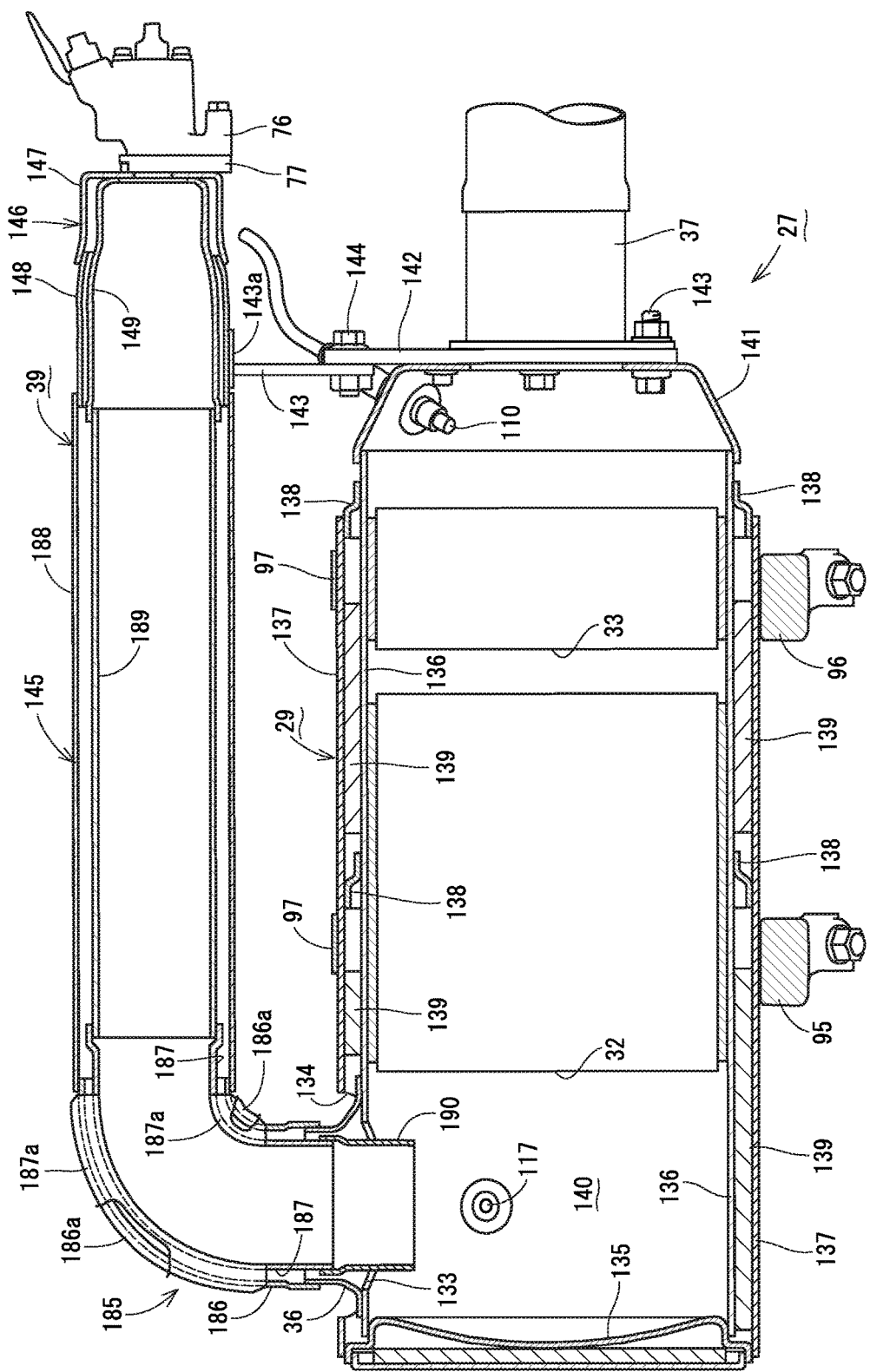
FIG. 15 is an explanatory view of a cross section of a second case and a urea mixing pipe.

Next, a description will be given of a structure of the second case 29 and the urea mixing pipe 39 with reference to FIGS. 3, 15, and 16. As shown in FIGS. 3 and 15, the urea mixing pipe 39 is formed by a straight tubular portion 145 which forms ammonia according to a hydrolysis of the urea, a urea water injection portion 146 which is provided in an exhaust gas upstream side end portion of the straight tubular portion 145, and an elbow tubular portion 185. An exhaust gas inlet side of the urea water injection portion 46 is fastened by bolts to an exhaust gas outlet side of a DPF outlet pipe 35 by the DPF outlet side flange body 41, an exhaust gas inlet side of the straight tubular portion 145 is fixed by welding to an exhaust gas outlet side of the urea water injection portion 146, and an exhaust gas inlet side of the elbow tubular portion 185 is fixed by welding to an exhaust gas outlet side of the straight tubular portion 145, thereby moving the exhaust gas from the first case 28 to the urea mixing pipe 39.

Figure 16:
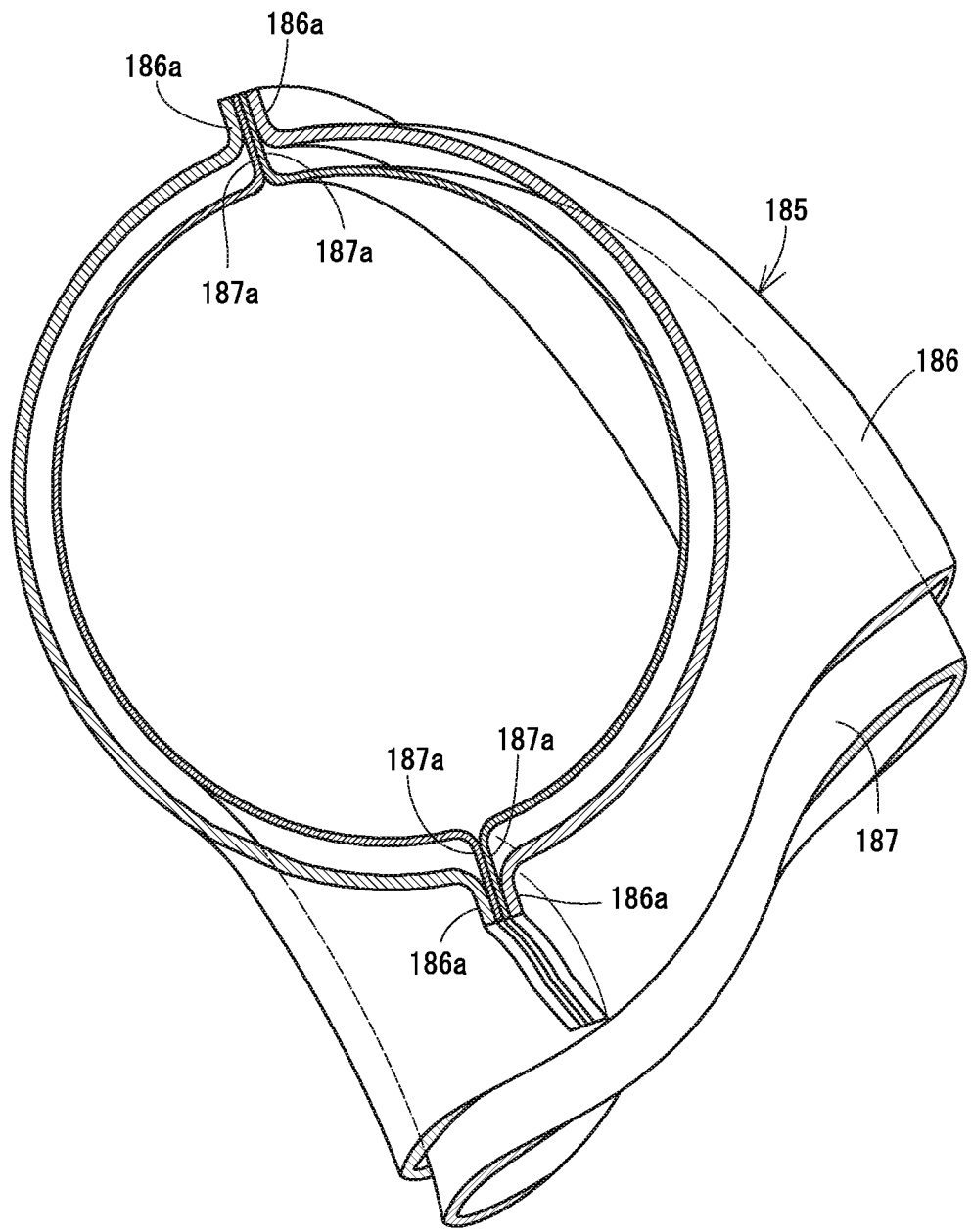
FIG. 16 is an explanatory view of a cross section of the urea mixing pipe.
Figure 17:
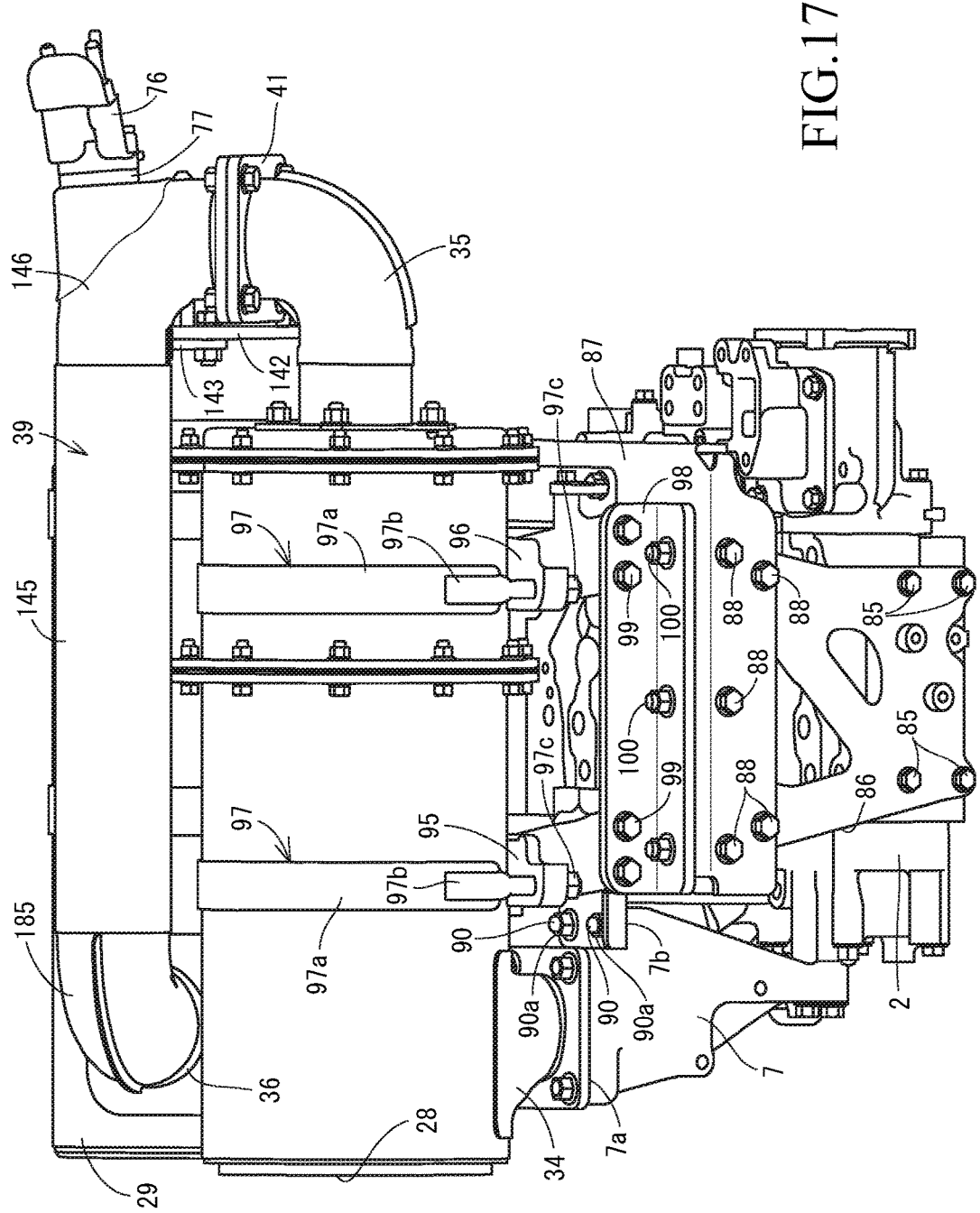
FIG. 17 is an explanatory view of a back elevation of the exhaust gas purification device and a cylinder head support portion.

As shown in FIGS. 15 and 16, the elbow tubular portion 185 has an elbow outer pipe 186 which is formed by a pair of halved tube bodies obtained by dividing a cylinder into two sections in a longitudinal direction, and a connection flange portion 186a is formed in the portion by folding end portions in the longitudinal direction of the halved tube bodies of the elbow outer pipe 186 outward. In the same manner, the elbow tubular portion 185 has an elbow inner pipe 187 which is formed by a pair of halved tube bodies obtained by dividing a cylinder into two sections in a longitudinal direction, and a connection flange portion 187a is formed in the portion by folding end portions in the longitudinal direction of the halved tube bodies of the elbow inner pipe 187 outward. Further, the elbow outer pipe 186 and the elbow inner pipe 187 of the elbow tubular portion 185 are integrally formed by pinching the connection flange portion 187a of the elbow inner pipe 187 by the connection flange portion 186a of the elbow outer pipe 186 so as to fix by welding.

As shown in FIG. 15, the straight tubular portion 145 of the urea mixing pipe 39 has a mixing outer pipe 188 and a mixing inner pipe 189 of a double pipe structure. A pipe length of the mixing inner pipe 189 is formed shorter than a pipe length of the mixing outer pipe 188. An exhaust gas inlet side of the elbow inner pipe 187 is protruded out of a cylindrical opening in an exhaust gas inlet side of the elbow outer pipe 186 in the elbow tubular portion 185, the exhaust gas inlet side of the elbow outer pipe 186 is fixed by welding to an exhaust gas outlet side of the mixing outer pipe 188, and the exhaust gas inlet side of the elbow tubular portion 185 is connected to the exhaust gas outlet side of the straight tubular portion 145 by fixing by welding the exhaust gas inlet side of the elbow inner pipe 187 to the exhaust gas outlet side of the mixing inner pipe 189. More specifically, the exhaust gas inlet side of the elbow tubular portion 185 is integrally connected to the exhaust gas outlet side of the urea mixing pipe 39.

In addition, the exhaust gas outlet side of the elbow inner pipe 187 is protruded out of the cylindrical opening in the exhaust gas outlet side of the elbow outer pipe 186 in the elbow tubular portion 185, the exhaust gas outlet side of the elbow outer pipe 186 is fixed by welding to the exhaust gas inlet side of the SCR inlet pipe 36, and an exhaust gas inlet side of an extension pipe 190 is fixed by welding to the exhaust gas outlet side of the elbow inner pipe 187.

Further, as shown in FIG. 15, the second case 29 is formed into a double pipe structure by an inner case 136 and an outer case 137. An SCR catalyst 32 and an oxidation catalyst 33 for urea selective catalyst reducing are accommodated in the inner case 136. An outer peripheral side of the inner case 136 and an inner peripheral side of the outer case 137 are connected via a support body 138 having a ring shape and made of a thin plate. A case heat insulation material 139 made of heat resisting fiber is filled between the outer peripheral side of the inner case 136 and the inner peripheral side of the outer case 137.

As shown in FIG. 15, an inlet side lid body 135 is fixed by welding to one end side (an end portion in an exhaust gas upstream side) of the inner case 136 and the outer case 137. One end sides of tubular opening portions of the inner case 136 and the outer case 137 are closed by the inlet side lid body 135. Further, exhaust gas inlets 133 and 134 are formed in the inner case 136 and the outer case 137 between the SCR catalyst 32 accommodation portion and the inlet side lid body 135. The exhaust gas inlet 134 of the outer case 137 is formed larger in diameter than the exhaust gas inlet 133 of the inner case 136, and the exhaust gas outlet side of the SCR inlet pipe 36 is fixed by welding to the outer peripheral side of the exhaust gas inlet 133 of the inner case 136.

More specifically, the inner tube 187 of the elbow tubular portion 185 is formed smaller in diameter than the inlet opening of the inner case 136, and the outlet opening of the SCR inlet pipe 36 is formed larger in diameter than the inlet opening of the SCR inlet pipe 36. The SCR inlet pipe 36 is passed through the exhaust gas inlet 134 of the outer case 137, and the inner portion of the SCR inlet pipe 36 is communicated with the inner side of the inner case 136. An exhaust gas supply chamber 140 of the second case 29 is formed in an inner portion of the inner case 136 between the SCR catalyst 32 and the inlet side lid body 135, and the exhaust gas outlet side of the inner pipe 187 in the elbow tubular portion 185 is protruded out of the exhaust gas inlet side of the extension pipe 190 protruded to the exhaust gas outlet side of the SCR inlet pipe 36, toward an inner portion of the exhaust gas supply chamber 140.

According to the structure mentioned above, the exhaust gas supply chamber 140 of the second case 29 is formed between an exhaust gas acceptance end surface of the SCR catalyst 32 and the inlet side lid body 135 obtained by depressing an opposing surface to the SCR catalyst 32 into a concave surface. The exhaust gas mixed with the urea water as the ammonia is put into the exhaust gas supply chamber 140 from the inner pipe 187 of the elbow tubular portion 185, and the exhaust gas is passed to the inner portions of the SCR catalyst 32 and the oxidation catalyst 33, thereby reducing the nitrogen oxides (NOx) in the exhaust gas which is discharged out of the SCR outlet pipe 37 of the second case 29.

As shown in FIGS. 1, 15, and 16, in the engine device having the urea mixing pipe 39 which injects the urea water into the exhaust gas of the engine 1, and the second case 29 serving as the SCR case which removes the nitrogen oxides in the exhaust gas of the engine 1, and in which the inlet side of the second case 29 is connected to the outlet side of the urea mixing pipe 39, the engine device being structured such that the urea mixing pipe 39 is formed by the elbow outer pipe 186 and the elbow inner pipe 187 having the double pipe structure, and the second case 29 is formed by the inner case 136 body and the outer case 137 body having the double case structure, the exhaust gas outlet side end portion of the elbow outer pipe 186 is connected to the exhaust gas inlet 133 of the inner case 136 body, and the exhaust gas outlet side end portion of the elbow inner pipe 187 is protruded to the inner portion of the second case 29. Therefore, it is possible to prevent the elbow inner pipe 187 from coming into contact with the outside air, and it is possible to reduce the formation of the crystal lump of the urea component in the inner hole surface of the elbow inner pipe 187. It is possible to easily prevent the exhaust gas resistance of the elbow inner pipe 187 from being increased by the growth of the urea crystal lump.

As shown in FIG. 15, the exhaust gas outlet side end portion of the elbow outer pipe 186 is formed larger in diameter than the inlet opening of the inner case 136 body, and the exhaust gas outlet side end portion of the elbow outer pipe 186 is fixed by welding to the outer peripheral surface of the inner case 136 body. Therefore, the exhaust gas outlet side end portion of the elbow outer pipe 186 can be connected to the outer peripheral surface which is spaced from the inlet opening edge of the inner case 136 body in the outer peripheral surface of the inner case 136 body. More specifically, the elbow outer pipe 186 (the exhaust gas outlet side end portion) can be firmly fixed easily by welding process to the outer peripheral surface of the inner case 136 body while preventing the deformation of the inner case 136 body, and the exhaust gas outlet side end portion of the elbow outer pipe 186 can be connected with high rigidity to the outer peripheral surface of the inner case 136 body so as to be spaced from the inlet opening edge of the inner case 136 body, thereby improving a connection strength between the outer peripheral surface of the inner case 136 body and the exhaust gas outlet side end portion of the elbow outer pipe 186.

As shown in FIGS. 15 and 16, the elbow outer pipe 186 and the elbow inner pipe 187 are formed into a split structure, and are integrally structured by pinching a split connection portion of the elbow inner pipe 187 by a split connection portion of the elbow outer pipe 186. Therefore, it is not necessary to specially arrange a support member of the elbow inner pipe 187, and it is possible to prevent the crystal lump of the urea component from being formed in the vicinity of the exhaust gas inlet of the second case 29 while simplifying the pipe structure. It is possible to easily prevent contact between the exhaust gas outlet side end portion of the elbow inner pipe 187 which is protruded out of the elbow outer pipe 186 into the inner portion of the second case 29, and the exhaust gas inlet opening edge of the second case 29.

As shown in FIG. 15, the exhaust gas outlet side of the SCR inlet pipe 36 serving as the exhaust gas inlet pipe is firmly fixed to the inlet opening portion of the inner case 136 body, the exhaust gas inlet side of the SCR inlet pipe 36 is firmly fixed to the exhaust gas outlet side end portion of the elbow outer pipe 186, the exhaust gas inlet side of the extension pipe 190 is connected to the exhaust gas outlet side end portion of the elbow inner pipe 187, and the exhaust gas outlet side of the extension pipe 190 is protruded into the inner portion of the inner case 136 body. Therefore, the urea mixing pipe 39 can be connected to the second case 29 without bringing the elbow inner pipe 187 (the exhaust gas) into contact with the connection portion (the exhaust gas inlet pipe) between the second case 29 and the elbow outer pipe 186, and it is possible to prevent the urea crystal lump from being formed in the vicinity of the second case 29 inlet (the connection portion with the urea mixing pipe 39).

Further, as shown in FIG. 15, the exhaust gas outlet side of the inner case 136 is protruded out of the exhaust gas outlet side of the outer case 137 of the second case 29, and the outlet side lid body 141 is connected by weld fixation to the exhaust gas outlet side of the inner case 136. The outlet side lid body 141 is formed by a frustum shaped cylinder in which a diameter in the exhaust gas outlet side to which the SCR outlet pipe 37 is connected, is smaller than a diameter in the exhaust gas inlet side connected to the inner case 136. A tabular support stay body 142 is arranged in an outer side surface of the exhaust gas outlet of an outlet side lid body 141, and the SCR outlet pipe 37 and the support stay body 142 are fastened by bolts 143 to the outlet side lid body 141.

The tabular support stay body 142 may be fixed by welding to the outer side surface of the exhaust gas outlet of the outlet side lid body 141.

As shown in FIGS. 6, 11, 12, and 15, one end side of the support stay body 142 is extended in an outer peripheral direction of the second case 29, one end side of a mixing pipe support body 143 is fastened by bolts 144 to an extension end portion of the support stay body 142, a receiving portion 143a is provided in the other end side of the mixing pipe support body 143, the receiving portion 143a of the mixing pipe support body 143 is fixed by welding to a urea water injection portion 146 of the urea mixing pipe 39, and the urea water injection portion 146 of the urea mixing pipe 39 is supported to the exhaust gas outlet side of the second case 29 via the support stay body 142 and the mixing pipe support body 143.

Figure 11:
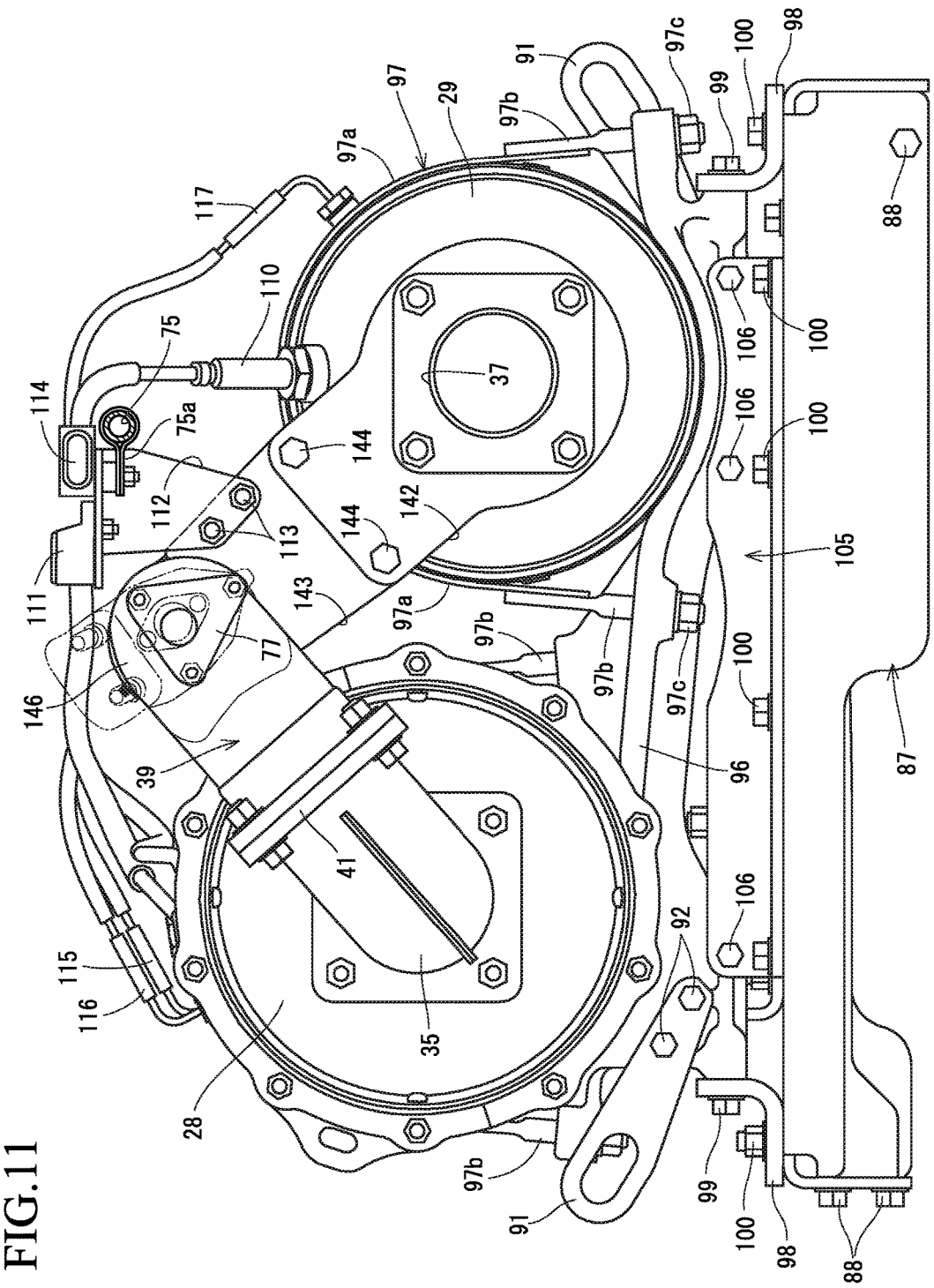
FIG. 11 is a right side elevational view of the exhaust gas purification device.
Figure 12:
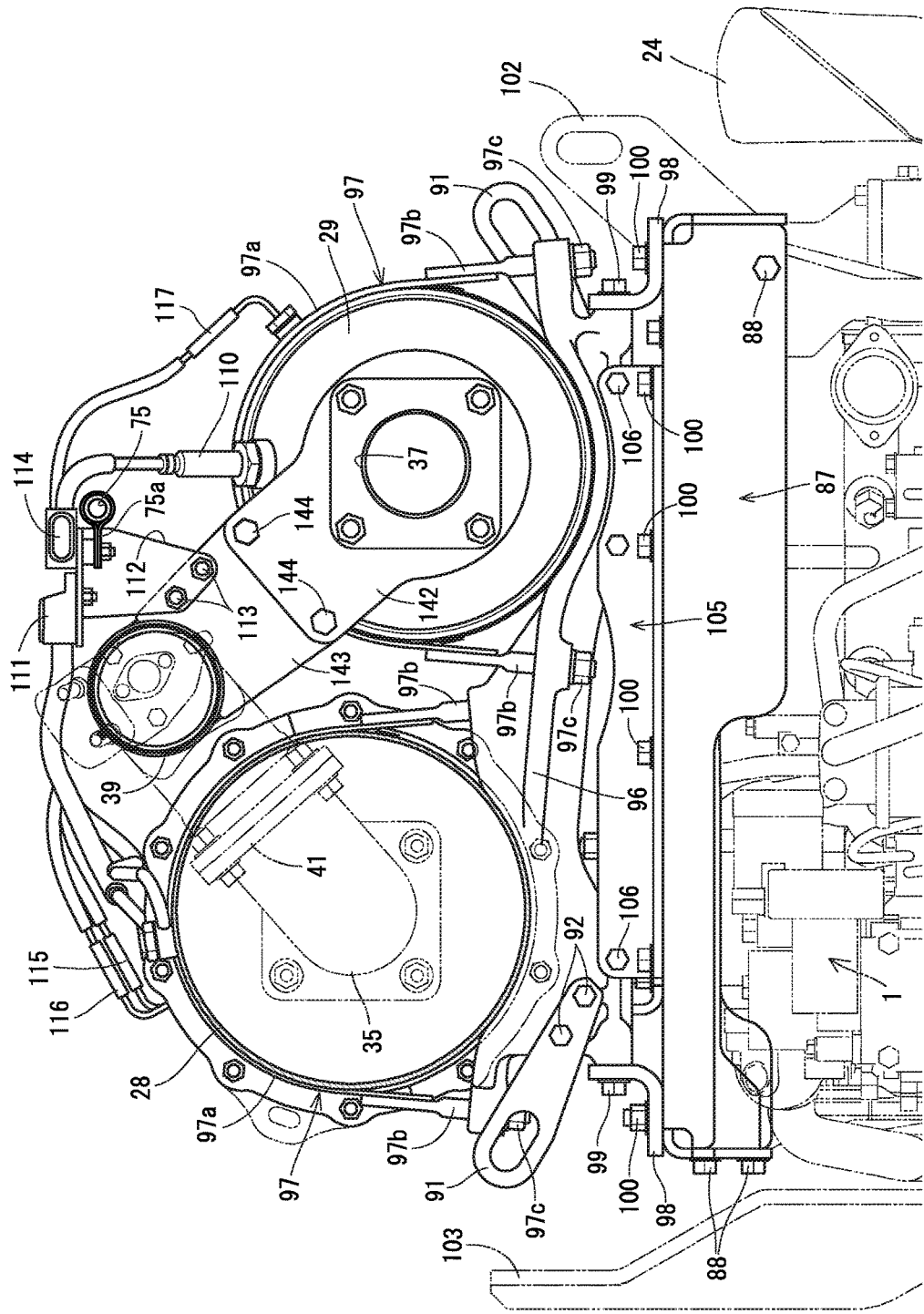
FIG. 12 is an explanatory view of a right side cross section of the exhaust gas purification device.
Figure 13:
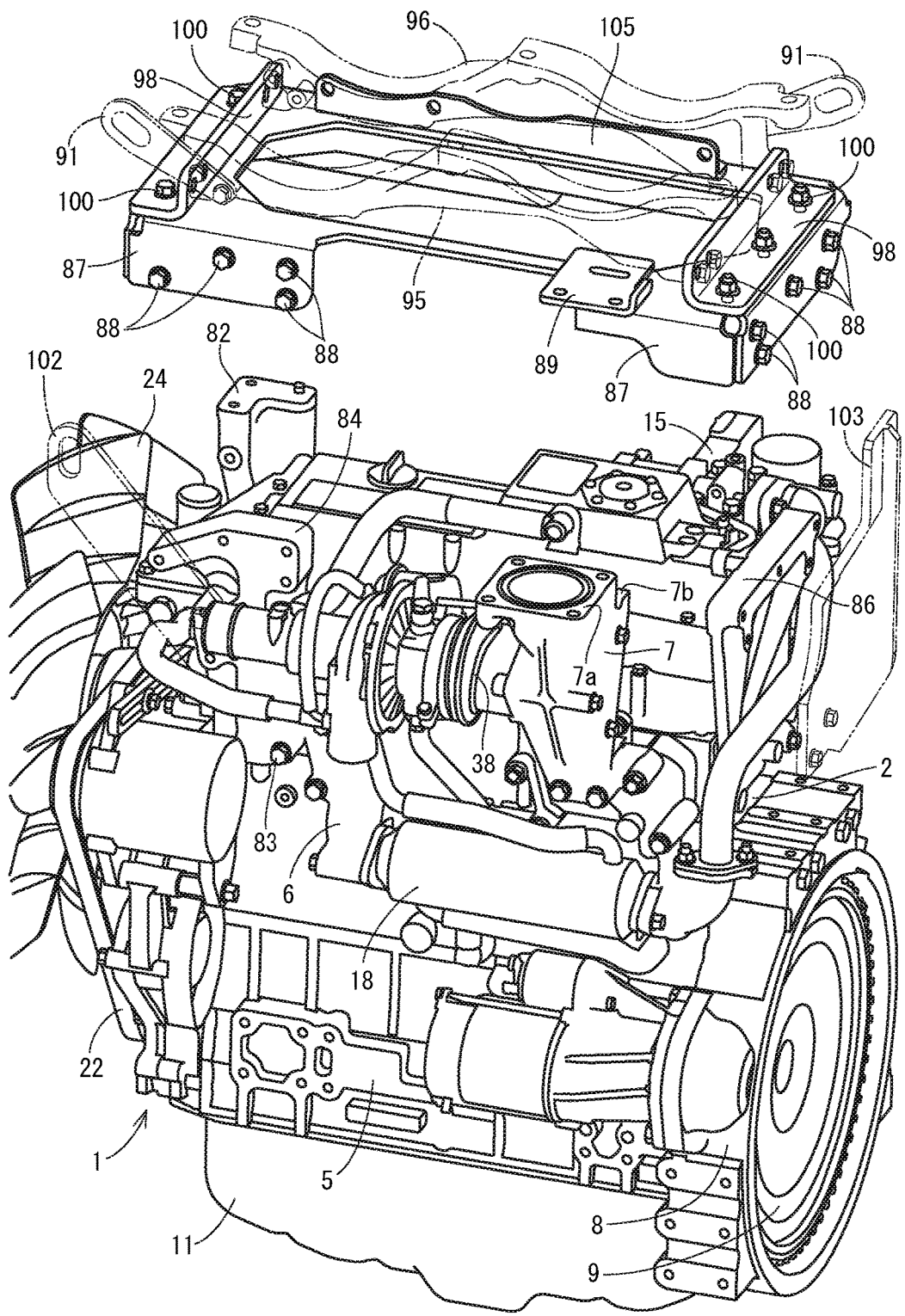
FIG. 13 is an exploded explanatory view of a support base portion of the exhaust gas purification device.
Figure 14:
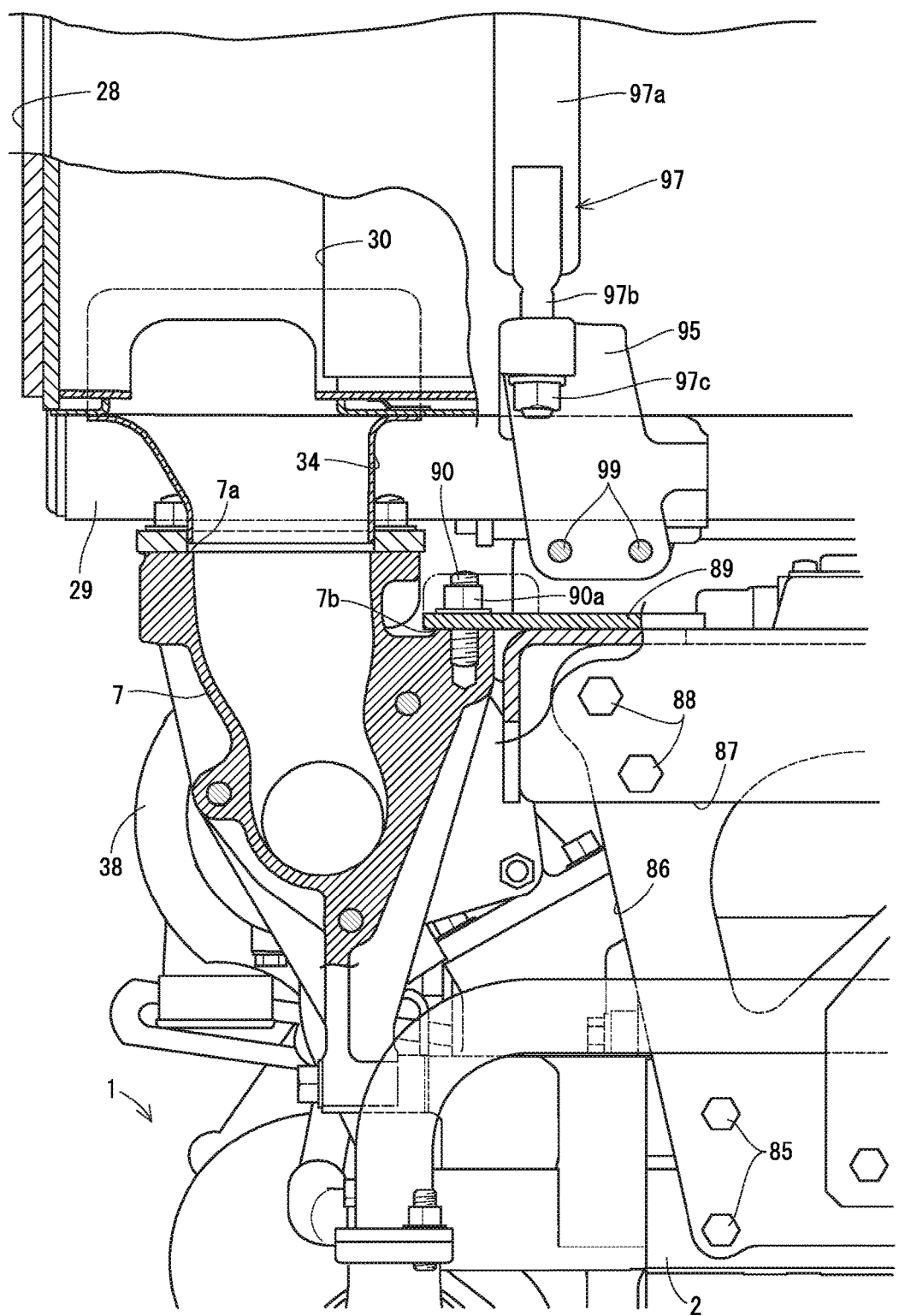
FIG. 14 is an explanatory view of a cross section of the support base portion of the exhaust gas purification device.

Meanwhile, as shown in FIGS. 11 and 12, the first case 28 is provided with DPF temperature sensors 115 and 116 which detect temperature of the exhaust gas in the vicinity of the oxidation catalyst 30 within the first case 28, and a DPF differential pressure sensor 111 which detects pressure of the exhaust gas of the soot filter 31 within the first case 28, and the second case 29 is provided with an SCR temperature sensor 117 which detects temperature of the exhaust gas inlet of the second case 29, and an NOx remaining sensor 110 which detects the nitrogen oxides (NOx) in the exhaust gas in the exhaust gas outlet side of the second case 29. A sensor bracket 112 is fastened by bolts 113 to the mixing pipe support body 143, and a wiring connector 114 electrically connected to each of the temperature sensors 115, 116, and 117 and the DPF differential pressure sensor 111 are attached to the sensor bracket 112. Further, a urea water injection pipe 75 mentioned later is attached to the sensor bracket 112 via an injection pipe holder 75a.

More specifically, since the residual volume of the particulate matters in the exhaust gas collected by the soot filter 31 is in proportion to the differential pressure of the exhaust gas, a soot filter regeneration control (for example, a fuel injection control or an intake air control of the diesel engine 1 for raising the temperature of the exhaust gas) is executed on the basis of results of detection of the differential pressure sensor 111 when an amount of the particulate matters remaining in the soot filter 31 is increased to a predetermined amount or more, the soot filter regeneration control reducing the amount of the particulate matters in the soot filter 31. Meanwhile, a urea water injection control is executed on the basis of results of detection of the NOx remaining sensor 110, the urea water injection control adjusting an amount of the urea water solution injected into the inner portion of the urea mixing pipe 39.

As shown in FIGS. 1 to 5, 11, 12, and 15, in the engine device having the urea mixing pipe 39 which injects the urea water into the exhaust gas of the diesel engine 1, and the second case 29 serving as the SCR case which removes the nitrogen oxides in the exhaust gas of the diesel engine 1, and structured such that the exhaust gas inlet side of the second case 29 is connected to the exhaust gas outlet side of the urea mixing pipe 39, the engine device is provided with the NOx remaining sensor 110 (the NOx sensor) which detects the nitrogen oxides included in the exhaust gas within the second case 29, the outlet side lid body 141 serving as the frustum shaped tapered taper portion is formed in the exhaust gas outlet side of the SCR case 29, and the NOx remaining sensor 110 is attached to the outlet side lid body 141. The NOx remaining sensor 110 is firmly fixed to the frustum shaped inclined surface of the outlet side lid body 141 in the direction which intersects the frustum shaped inclined surface of the outlet side lid body 141, and the NOx remaining sensor 110 is provided diagonally in relation to the center line in the exhaust gas moving direction of the second case 29. More specifically, the NOx remaining sensor 110 is supported so as to be tilted in the direction of the exhaust gas outlet of the SCR outlet pipe 37.

Therefore, in the structure in which the exhaust gas outlet side of the second case 29 is formed into the cylindrical shape, and the NOx remaining sensor stands erect in the direction of the outer diameter of the cylindrical shape, there is a defect that the gas accumulation part is formed in the corner portion of the cylindrical shape, and there is a defect that the 110 is orthogonally supported to the center line in the exhaust gas moving direction of the second case 29 and the NOx remaining sensor 110 greatly protrudes out of the outer peripheral side of the second case 29 toward the direction of the outer diameter. On the contrary, since the outlet side lid body 141 serving as the tapered taper portion having the frustum shape is formed in the exhaust gas outlet side of the SCR case 29, and the NOx remaining sensor 110 is attached to the outlet side lid body 141, it is possible to do away with the defect that the gas accumulation part is formed in the cylindrical corner portion in the exhaust gas outlet side of the second case 29, the exhaust gas can be smoothly moved toward the SCR outlet pipe 37 serving as the exhaust pipe connected thereto from the exhaust gas outlet side of the second case 29, and it is possible to appropriately measure the amount of the nitrogen oxides in the exhaust gas in the exhaust gas outlet side of the second case 29. Further, the NOx remaining sensor 110 can be supported to be inclined to the center line in the exhaust gas moving direction of the second case 29, the detection portion in the leading end of the NOx remaining sensor 110 can be protruded toward the center portion of the columnar catalyst 33 in the inner portion in the exhaust gas outlet side of the second case 29, and it is possible to improve a precision for measuring the amount of the nitrogen oxides. In addition, it is possible to form a base end side protruding dimension of the NOx remaining sensor 110 which is protruded out of the outer peripheral side of the second case 29 toward the direction of the outer diameter short, and it is possible to compactly construct the outer dimension of the second case 29.

As shown in FIGS. 11, 12, and 15, the exhaust gas inlet side of the second case 29 is integrally connected to the exhaust gas outlet side of the urea mixing pipe 39 by forming the exhaust gas inlet in the outer peripheral surface in one end side of the second case 29, and the exhaust gas inlet side of the urea mixing pipe 39 is connected to the exhaust gas outlet side of the second case 29 via the support member (the support stay body 142 and the mixing pipe support body 143) by forming the exhaust gas outlet in the end surface in the other end side of the second case 29. Therefore, the exhaust gas can be supplied to the inner portion in one end side of the second case 29 while diffusing, and it is possible to effectively work the action of purifying the SCR catalyst 32 for reducing the urea selective catalyst which is inward provided in the second case 29, it is possible to improve the function of purifying the exhaust gas in the second case 29, it is possible to smoothly discharge the exhaust gas out of the other end side of the second case 29, and it is possible to reduce the exhaust gas resistance in the second case 29.

As shown in FIG. 15, in the structure in which the tapered taper portion is formed by the outlet side lid body 141, the second case 29 has the inner case 136 and the outer case 137, the exhaust gas inlet side of the inner case 136 inward provided with the SCR catalyst 32 for reducing the urea selective catalyst is closed by the inlet side lid body 135, the exhaust gas outlet side of the inner case 136 is closed by the outlet side lid body 141, and the outer case 137 is outward provided in the outer peripheral side of the inner case 136 between the inlet side lid body 135 and the outlet side lid body 141. Therefore, it is possible to easily maintain the temperature of the exhaust gas and the SCR catalyst 32 within the inner case 136 equal to or higher than the predetermined temperature, and it is possible to improve the function of purifying the exhaust gas in the second case 29. Further, in the case that the inner case 136 or the outer case 137 is formed by a pipe obtained by bending a metal plate into a cylindrical shape, it is possible to easily secure a strength necessary for inward supporting the SCR catalyst 32 even in the case that the pipe thickness (the thickness of the metal plate) of the inner case 136 or the outer case 137 is thin. As a result, it is possible to achieve weight saving or reduction of manufacturing cost of the second case 29.

As shown in FIG. 15, the support body 138 made of the thin plate is provided as the spacer body which maintains the distance between the outer peripheral surface of the inner case 136 and the inner peripheral surface of the outer case 137 constant, and the outer case 137 is integrally connected to the outer peripheral side of the inner case 136 via the support body 138 made of the thin plate. Therefore, it is possible to easily improve the rigidity of the cylinder structure which is formed by the inner case 136 and the outer case 137, and it is possible to reduce the deformation and the damage of the inner case 136 or the outer case 137. Further, it is possible to save weight of the second case 29 and it is possible to reduce the manufacturing cost of the second case 29.

Further, as shown in FIGS. 17 and 19 to 22, there are provided with a urea water injection pump 73 which pressure feeds the urea water solution within a urea water tank 71, an electric motor 74 which drives the urea water injection pump 73, and a urea water injection body 76 which is connected to the urea water injection pump 73 via the urea water injection pipe 75. A urea water injection body 76 is attached to a urea water injection portion 146 of the urea mixing pipe 39 via an injection pedestal 77, and the urea water solution is sprayed into an inner portion of the urea mixing pipe 39 from the urea water injection body 76. The urea water injection portion 146 has an outer shell case 147 to which the injection pedestal 77 is fixed by welding, an outside connection pipe 148 which connects an exhaust gas inlet side of the mixing outer pipe 188 to an exhaust gas outlet side of the outer shell case 147, and a double pipe inside connection pipe 149 which is inward provided in the outer shell case 147 and the outside connection pipe 148. The exhaust gas inlet side of the inside connection pipe 149 is connected to the exhaust gas outlet side of the DPF outlet pipe 35 (a double pipe structure), and the exhaust gas inlet side of the mixing inner pipe 189 is connected to the exhaust gas outlet side of the inside connection pipe 149, thereby introducing the exhaust gas of the DPF outlet pipe 35 into the inner portion of the mixing inner pipe 189.

Further, a heat shielding concave portion 77a is formed in an adhesion surface of the injection pedestal 77 which is fixed by welding to the outer shell case 147, and the urea water injection body 76 is fastened by bolts 76b to the injection pedestal 77 which is fixed by welding to the outer shell case 147, thereby making the heat shielding concave portion 77a be spaced from a weld fixing surface of the outer shell case 147, forming the injection pedestal 77 with less adhesion area in relation to the weld fixing surface of the outer shell case 147, shielding heat of the outer shell case 147 heated by the exhaust gas by the heat shielding concave portion 77a, and preventing the injection pedestal 77 from being heated by the heat of the outer shell case 147. More specifically, it is possible to reduce transmission of the exhaust heat of the outer shell case 147 to the urea water injection body 76, and it is possible to protect a urea water injection valve 76a of the urea water injection body 76, the urea water injection pipe 75 which is communicated with and connected to the urea water injection valve 76a, or a control harness (not shown) which is electrically connected to the urea water injection valve 76a.

As shown in FIGS. 1 to 5, 11, 12, 15, 18, and 20, in the engine device having the urea mixing pipe 39 which injects the urea water into the exhaust gas of the diesel engine 1, and the second case 29 serving as the SCR case which removes the nitrogen oxides in the exhaust gas of the diesel engine 1, and connecting the inlet side of the second case 29 to the outlet side of the urea mixing pipe 39, the exhaust gas outlet side of the second case 29 is connected to the exhaust gas inlet side of the urea mixing pipe 39 where the urea water injection valve 76a serving as the urea water injection means is arranged, and the exhaust gas inlet side of the urea mixing pipe 39 is supported to the exhaust gas outlet side of the second case 29. Therefore, it is possible to improve a support rigidity of the exhaust gas inlet side of the urea mixing pipe 39 on the basis of the connection to the exhaust gas outlet side of the second case 29, it is possible to suppress a mechanical oscillation, and it is possible to reduce damage of the urea water injection valve 76a. It is possible to achieve weight saving without necessity of making the rigidity of the urea mixing pipe 39 or the second case 29 high. It is possible to achieve parts number reduction or manufacturing cost reduction of the attaching structure of the urea mixing pipe 39 by applying a piping function to the exhaust gas outlet side of the second case 29.

As shown in FIGS. 11, 12, 15, and 18, there are provided the mixing pipe support body 143 and the support stay body 142 which are detachably connected, the mixing pipe support body 143 is connected to the exhaust gas inlet side of the urea mixing pipe 39, and the support stay body 142 is connected to the exhaust gas outlet side of the second case 29. Therefore, it is possible to absorb a connection error between the first case 28 or the second case 29 and the case fixing bodies 95 and 96, or an attaching dimension error in the exhaust gas inlet side of the urea mixing pipe 39 by adjusting the connection between the mixing pipe support body 143 and the support stay body 142, and it is possible to improve a piping workability for connecting to the exhaust gas inlet side of the urea mixing pipe 39 as well as it is possible to improve an assembling workability of the urea mixing pipe 39.

For example, when assembling the exhaust gas purification device 27, the left case fixing body 95 and the right case fixing body 96 are fastened by bolts 99 and 106 to the support frame body 98 and the side portion support frame body 105, as well as the support frame body 98 and the side portion support frame body 105 are fastened by bolts 100 to the support base 87. Further, the first case 28 and the second case 29 are mounted to the left case fixing body 95 and the right case fixing body 96, the DPF outlet pipe 35 is connected to the exhaust gas inlet side of the urea mixing pipe 39 via the DPF outlet side flange body 41, and the mixing pipe support body 143 and the support stay body 142 are fastened by bolts 144. The fastening between the mixing pipe support body 143 and the support stay body 142 by bolts 144 absorbs the connection error between the mixing pipe support body 143 and the support stay body 142 by loosely fitting and inserting the bolts 144 to one or both of the mixing pipe support body 143 and the support stay body 142.

Next, the fastening band 97 is wound around the outer peripheries of the first case 28 and the second case 29, both end sides of the fastening band main body 97a are connected to the left case fixing body 95 and the right case fixing body 96 via the fastening bolt 97b and the fastening nut 97c, and the first case 28 and the second case 29 are firmly fixed to the left case fixing body 95 and the right case fixing body 96. More specifically, the first case 28 and the second case 29 are fixedly supported to the left case fixing body 95 and the right case fixing body 96, thereby finishing the assembling work of the exhaust gas purification device 27.

Figure 18:
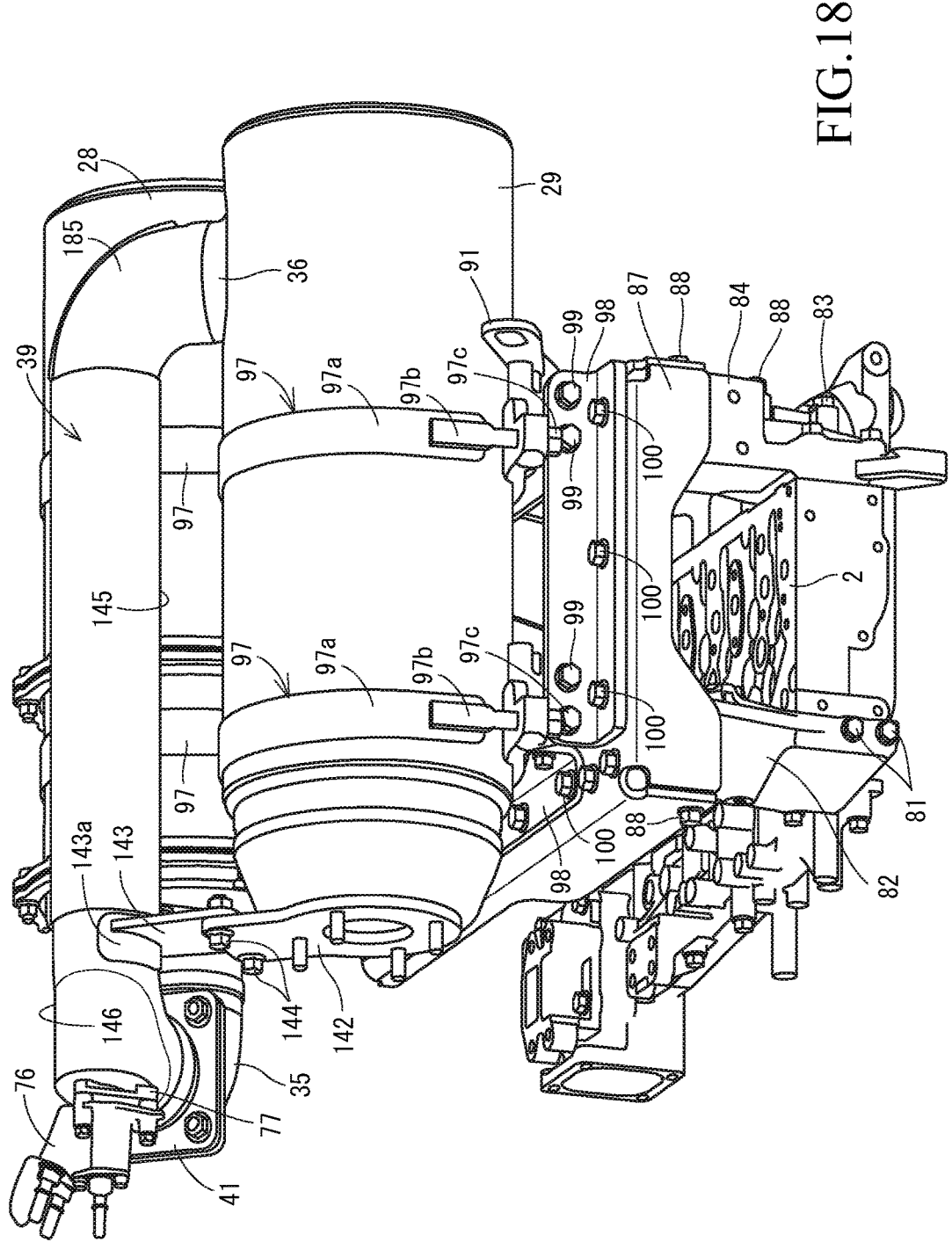
FIG. 18 is an explanatory view of a front surface of the exhaust gas purification device and the cylinder head support portion.
Figure 19:
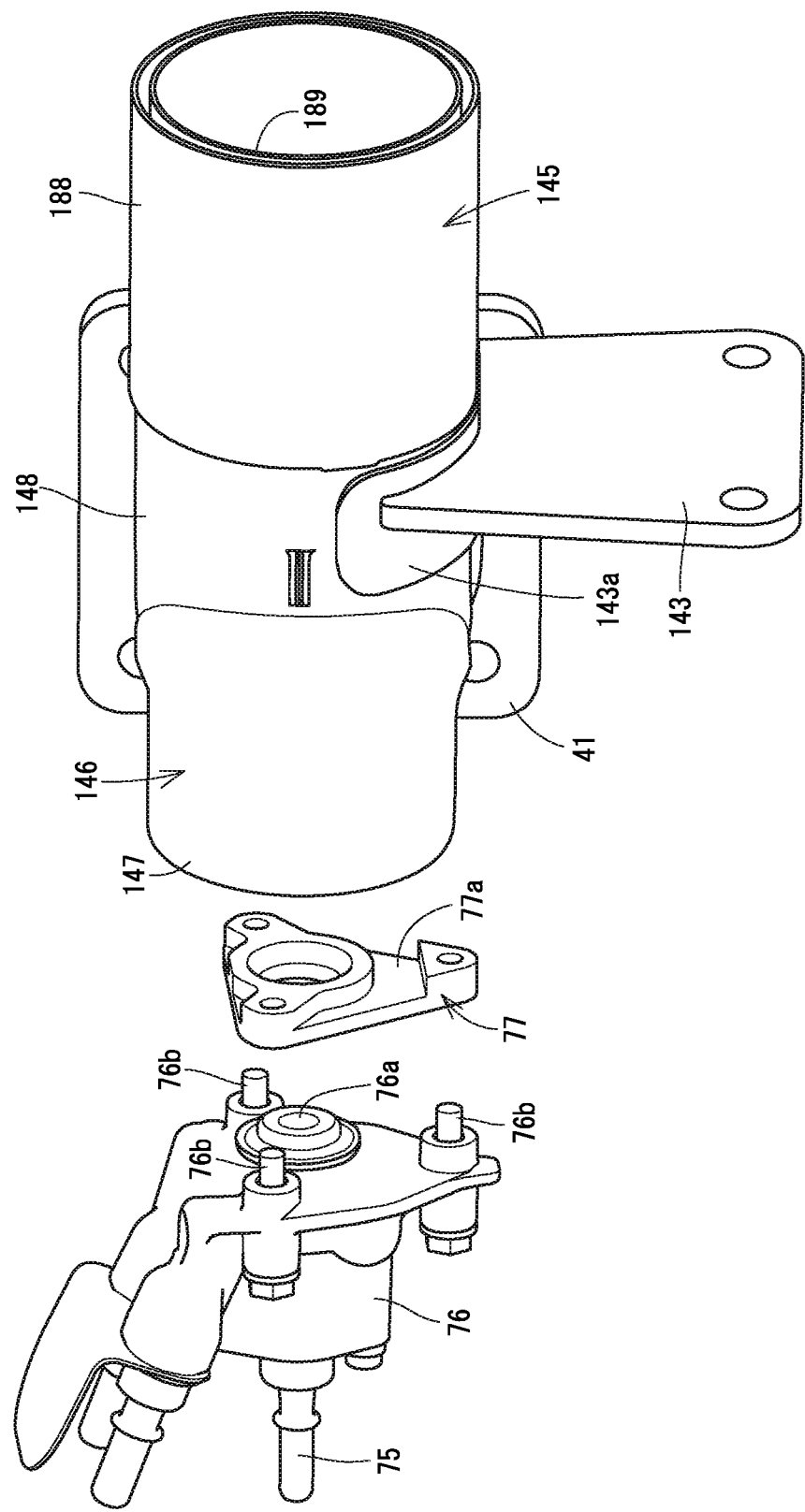
FIG. 19 is an exploded explanatory view of a urea injection portion of the urea mixing pipe.
Figure 20:
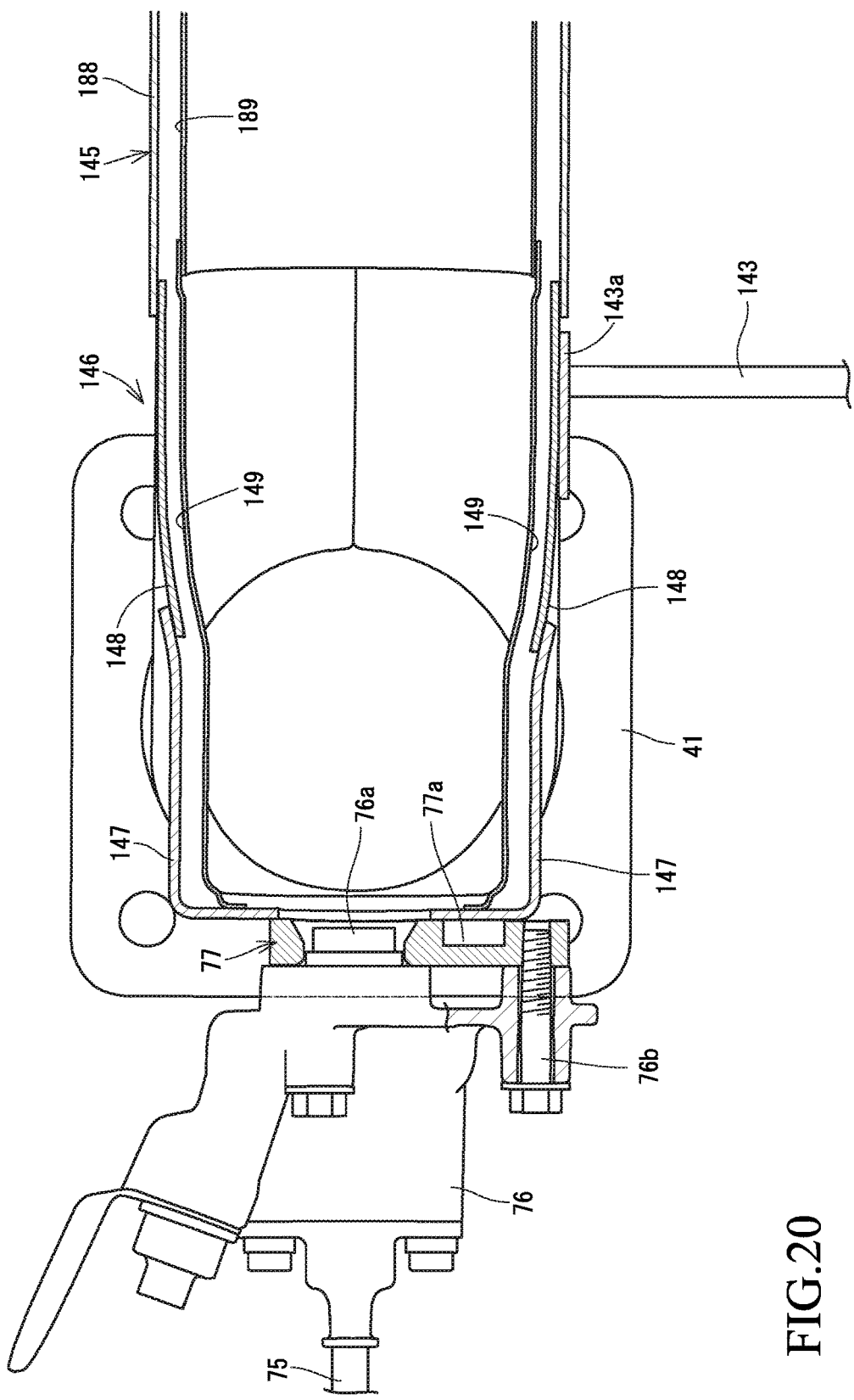
FIG. 20 is an explanatory view of a cross section of the urea injection portion of the urea mixing pipe.

As shown in FIGS. 15 and 18, the exhaust gas inlet side of the second case 29 is firmly fixed integrally to the exhaust gas outlet side of the urea mixing pipe 39, the urea water injection portion 146 is arranged in the exhaust gas inlet side of the urea mixing pipe 39, and the mixing pipe support body 143 is firmly fixed integrally to the outer peripheral surface of the urea water injection portion 146 where the urea water injection valve 76a is arranged, at the same time. Therefore, it is possible to support in a quakeproofing manner the exhaust gas inlet side of the urea mixing pipe 39, it is possible to reduce the oscillation of the urea water injection portion 146 where the urea water injection valve 76a is arranged, and it is possible to improve the durability of the urea water injection portion 146.

As shown in FIGS. 11, 12, and 15, the SCR outlet pipe 37 serving as the exhaust pipe is fastened and fixed to the exhaust gas outlet side of the second case 29 via the support stay body 142. Therefore, the support stay body 142 can be attached to the second case 29 by using the bolts 143 fastening the SCR outlet pipe 37 to the second case 29 in common. It is possible to apply a connection function of the SCR outlet pipe 37 to the support stay body 142, and it is possible to reduce the manufacturing cost by reducing the constituting parts number. It is possible to structure such that the SCR outlet pipe 37 can be fastened by bolts 143 to the support stay body 142 by fixing the support stay body 142 by welding to the exhaust gas outlet side of the second case 29, and the support stay body 142 and the SCR outlet pipe 37 are connected in common to the exhaust gas outlet side of the second case 29 by the bolts 143.

As shown in FIGS. 1 to 5, 11, 12, 15, and 18, in the engine device having the urea mixing pipe 39 which injects the urea water into the exhaust gas of the diesel engine 1, and the second case 29 serving as the SCR case which removes the nitrogen oxides in the exhaust gas of the diesel engine 1, and structured such that the exhaust gas inlet side of the second case 29 is connected to the exhaust gas outlet side of the urea mixing pipe 39, the urea water injection body 76 is arranged in the exhaust gas inlet side of the urea mixing pipe 39 which is connected to the exhaust gas outlet side of the second case 29 by the support stay body 142 and the mixing pipe support body 143 which serves as the support member, and the urea water injection pipe 75 serving as the urea water supply hose which is connected to the urea water injection body 76 is firmly fixed to the mixing pipe support body 143 by the injection pipe holder 75a serving as the clamp member. Therefore, in spite that it is possible to reduce the damage of the urea water injection pipe 75 caused by the machine oscillation of the diesel engine 1, it is possible to simplify the support structure of the urea water injection pipe 75 or the harness by making good use of the support stay body 142 and the mixing pipe support body 143, and it is possible to achieve the parts number reduction or the manufacturing cost reduction of the attaching structure of the urea water injection pipe 75 or the harness.

As shown in FIGS. 11, 12, 15, and 18, the support member is formed by the mixing pipe support body 143 and the support stay body 142 which are detachably connected, the mixing pipe support body 143 is connected to the exhaust gas inlet side of the urea mixing pipe 39, the support stay body 142 is connected to the exhaust gas outlet side of the second case 29, and the urea water injection pipe 75 is supported to the mixing pipe support body 143 via the injection pipe holder 75a. Therefore, the mixing pipe support body 143 can be firmly fixed to the urea mixing pipe 39 according to a simple processing work such as a welding process, an assembling workability can be improved by reducing the assembled parts of the urea mixing pipe 39, and it is possible to improve a piping workability for connecting to the exhaust gas inlet side of the urea mixing pipe 39.

As shown in FIGS. 15 and 18, in the structure in which the urea water injection portion 146 is provided in the exhaust gas inlet side of the urea mixing pipe 39, and the urea water injection body 76 is arranged in the urea water injection portion 146, the mixing pipe support body 143 is firmly fixed integrally to the urea water injection portion 146. Therefore, it is possible to mutually improve an attaching rigidity to the urea water injection body 76 of the urea water injection portion 146, and a connecting rigidity of the mixing pipe support body 143, it is possible to support in a quakeproofing manner the exhaust gas inlet side of the urea mixing pipe 39, and the urea water injection portion 146 can be constructed as the structure which is excellent in durability.

As shown in FIGS. 11 and 12, the injection pipe holder 75a or the wiring connector 114 is arranged in the sensor bracket 112 by firmly fixing the sensor bracket 112 to the mixing pipe support body 143. Therefore, in spite that the exhaust gas inlet side of the urea mixing pipe 39 can be constructed as the structure which is excellent in the durability by adding the clamping function of the urea water injection pipe 75 or the wiring connector 114 to the quakeproofing support structure of the urea water injection body 76, it is possible to reduce the manufacturing cost by reducing the constituting parts number in the exhaust gas inlet side of the urea mixing pipe 39.

Figure 22:
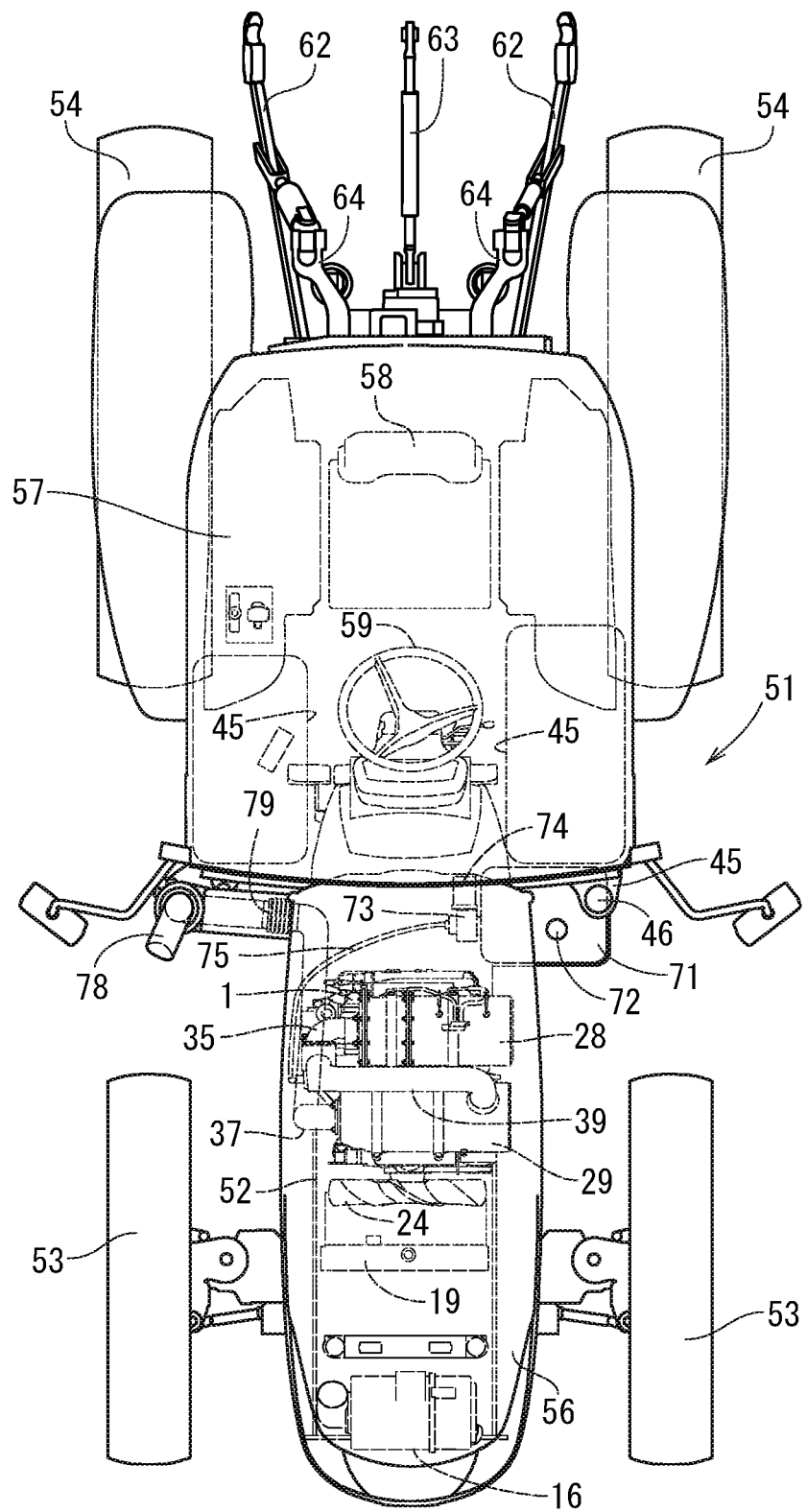
FIG. 22 is a plan view of the same.

Next, a description will be given of a tractor 51 which mounts the diesel engine 1 thereon with reference to FIGS. 21 and 22. The tractor 51 serving as the working vehicle shown in FIGS. 21 and 22 is adapted to perform a tilling work for tilling a farm field by being installed a tilling work machine (not shown). FIG. 21 is a side elevational view of a tractor for an agricultural work, and FIG. 22 is a plan view of the same. In the following description, a left side in a direction toward a forward moving direction of the tractor is simply called as a left side, and a right side in the direction toward the forward moving direction is simply called as a right side.

As shown in FIGS. 21 and 22, the tractor 51 for the agricultural work serving as the working vehicle is adapted to travel forward and backward by supporting a travel machine body 52 by a pair of right and left front wheels 53 and a pair of right and left rear wheels 54, mounting the diesel engine 1 to a front portion of the travel machine body 52, and driving the rear wheels 54 and the front wheels 53 by the diesel engine 1. The upper surface side and both the right and left side surfaces of the diesel engine 1 are covered with a hood 56 which can be opened and closed.

Further, a cabin 57 which an operator gets on board is installed in a rear side of the hood 56 among the upper surface of the travel machine body 52. An inner portion of the cabin 57 is provided with a control seat 58 on which the operator seats, and control instruments such as a control steering wheel 59 serving as a steering means. Further, a pair of right and left steps 60 for the operator to get on and off are provided in right and left outside portions of the cabin 57, and a fuel tank 45 for supplying the fuel to the diesel engine 1 is provided in a lower side of a bottom portion of the cabin 57 and inside the step 60.

Further, the travel machine body 52 is provided with a transmission case 61 for changing speed of the output from the diesel engine 1 so as to transmit it to the rear wheels 54 (the front wheels 53). The tilling work machine (not shown) is coupled to a rear portion of the transmission case 61 via a lower link 62, a top link 63, and a lift arm 64 so as to be movable up and down. Further, a PTO shaft 65 driving the tilling work machine is provided in a rear side surface of the transmission case 61. The travel machine body 52 of the tractor 51 is constructed by the diesel engine 1, the transmission case 61, and a clutch case 66 coupling them.

In addition, the exhaust gas purified by the second case 29 is discharged from a tail pipe 78 toward an upper side of the cabin 57 by disposing the tail pipe 78 in a rising manner on a front surface of a right corner portion of the cabin 57 in the front surface of the cabin 57, extending a lower end side of the tail pipe 78 toward an inner portion of the hood 56, and connecting a lower end side of the tail pipe 78 to the SCR outlet pipe 37 via a bellows tubular flexible pipe 79, as shown in FIGS. 21 and 22. The machine vibration transmitted to the tail pipe 78 side from the diesel engine 1 side is reduced by the connection of the flexible pipe 79. Further, a urea water tank 71 is installed to a left side portion of the hood 56 in an opposite side to a right side portion where the tail pipe 78 is arranged, in the front surface of the cabin 57. More specifically, the urea water tank 71 is arranged in a sorting manner in the left side portion of the rear portion of the hood 56 while the tail pipe 78 is arranged in the right side portion of the rear portion of the hood 56.

Further, the urea water tank 71 is mounted to the travel machine body 52 (a bottom portion frame of the cabin 57) in the leftward rear portion of the hood 56. An oil hole 46 of the fuel tank 45 and a water filler 72 of the urea water tank 71 are adjacently provided in a lower portion of a front surface in the left side of the cabin 57. The tail pipe 78 is arranged in the front surface in the right side of the cabin 57 where an operator gets on and off with low frequency, and the oil hole 46 and the water filler 72 are arranged in the front surface in the left side of the cabin 57 where the operator gets on and off with high frequency. The cabin 57 is structured such that the operator can get on and off the control seat 58 from any of the left side and the right side.

According to the structure mentioned above, the carbon monoxide (CO) and the carbon hydride (HC) in the exhaust gas of the diesel engine 1 can be reduced by the oxidation catalyst 30 and the soot filter 31 within the first case 28. Next, the urea water from the urea water injection valve 76a is mixed into the exhaust gas from the diesel engine 1 in the inner portion of the urea mixing pipe 39. Further, the nitrogen oxides (NOx) in the exhaust gas mixed with the urea water as ammonia is reduced by the SCR catalyst 32 and the oxidation catalyst 33 within the second case 29, and is discharged out of the tail pipe 78 toward the machine outside.

Figure 23:
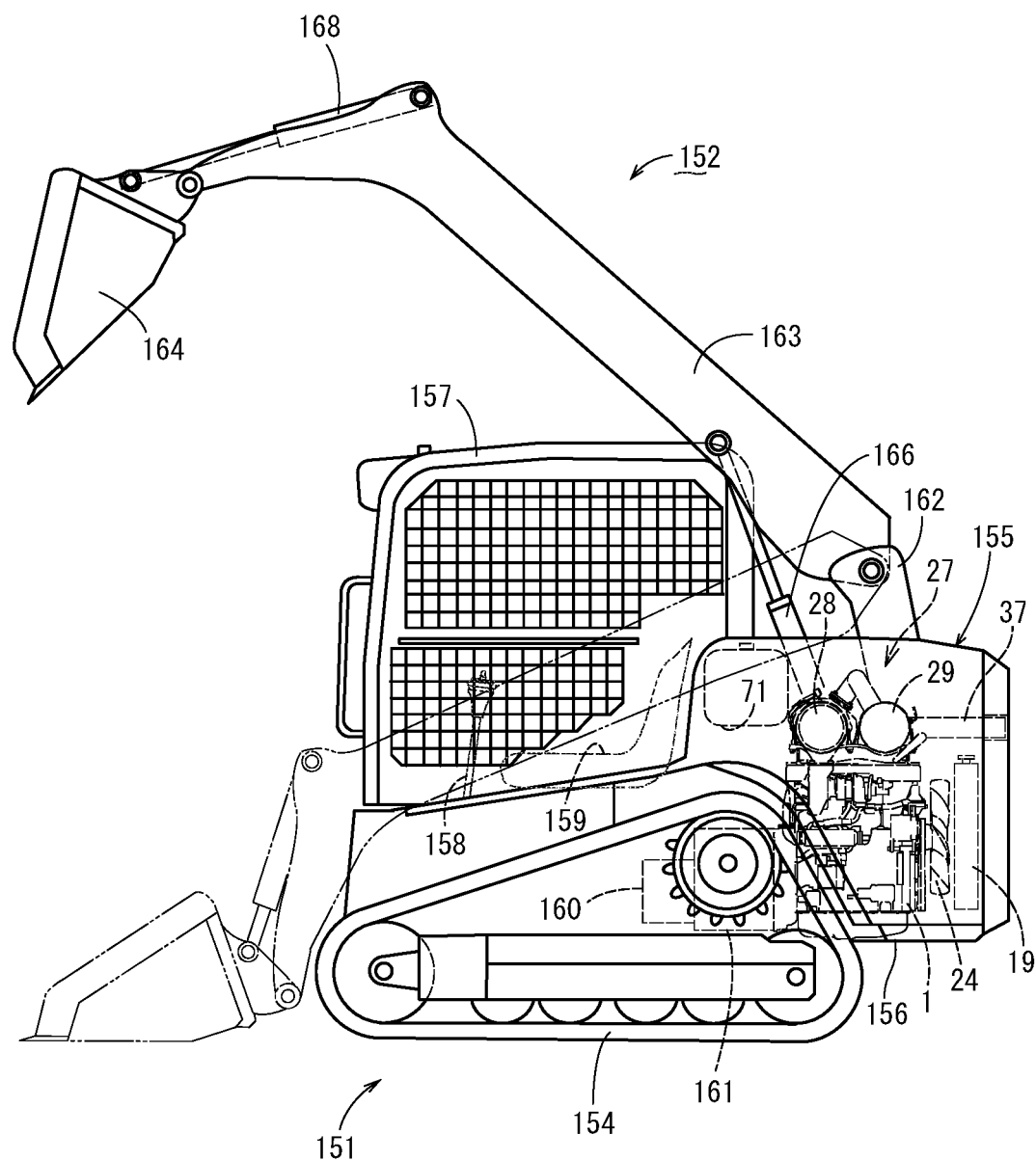
FIG. 23 is a side elevational view of a working vehicle which mounts a diesel engine thereto.
Figure 24:
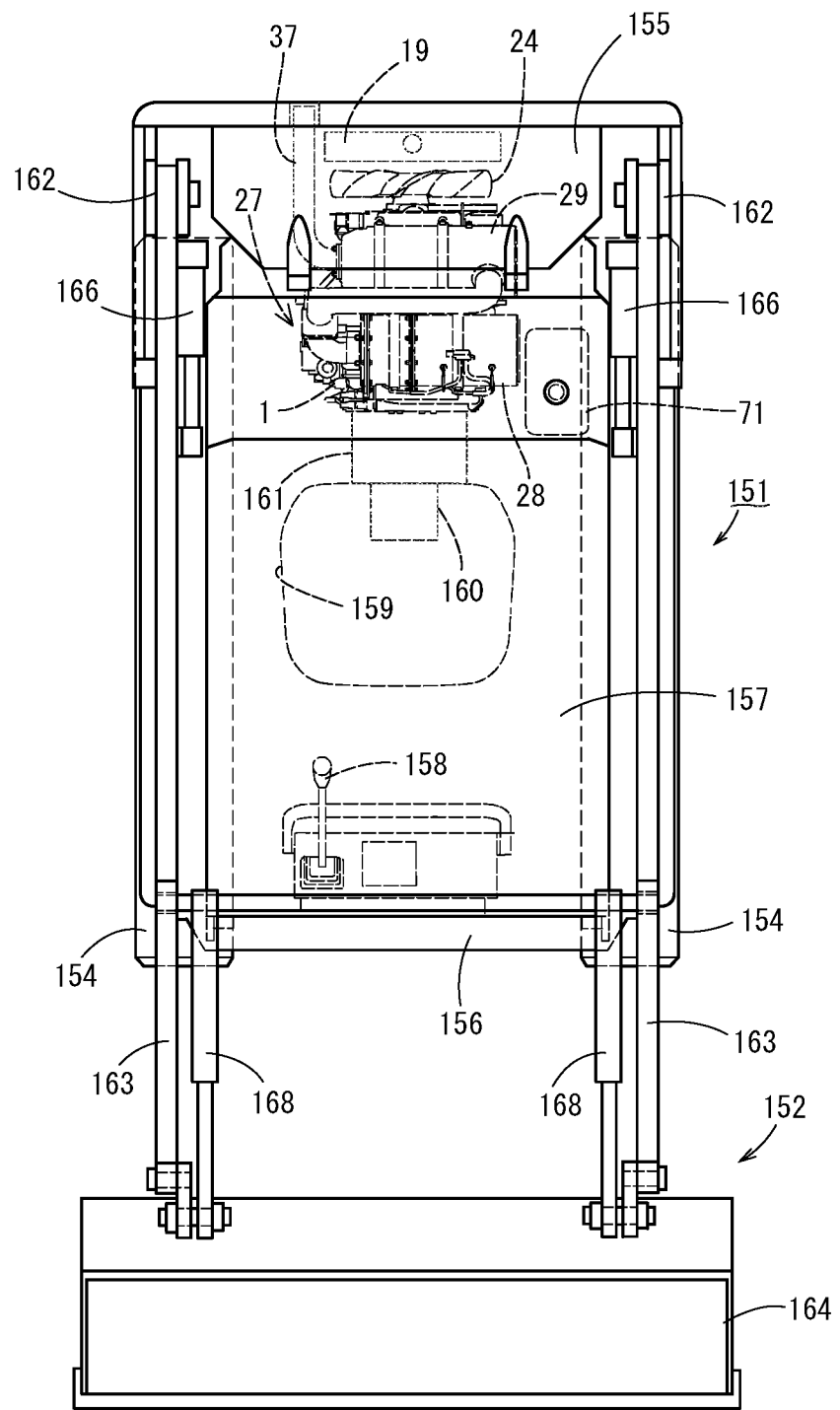
FIG. 24 is a plan view of the working vehicle.

Next, a description will be given of a skid steer loader 151 which mounts the diesel engine 1 thereon, with reference to FIGS. 23 and 24. The skid steer loader 151 shown in FIGS. 23 and 24 and serving as the working vehicle installs a loader device 152 mentioned later thereto and is adapted to carry out a loading work. Right and left travel crawler portions 154 are installed to the skid steer loader 151. Further, an openable hood 155 is arranged above the travel crawler portions 154 of the skid steer loader 151. The diesel engine 1 is accommodated within the hood 155. The first case 28 and the second case 29 are mounted on and fixed to the upper surface portion of the diesel engine 1.

The diesel engine 1 is supported to a travel machine body 156 provided in the skid steer loader 151 via a vibration isolation member. A cabin 157 which a driver gets on board is arranged in front of the hood 155, and a control steering wheel 158 and a driver seat 159 are provided in an inner portion of the cabin 157. Further, there are provided a loading work hydraulic pump device 160 which is driven by the diesel engine 1, and a travel transmission device 161 which drives the right and left travel crawler portion 154. The power from the diesel engine 1 is transmitted to the right and left travel crawler portions 154 via the travel transmission device 161. An operator seating on the driver seat 159 can carry out a traveling operation of the skid steer loader 151 via a control portion such as the control steering wheel 158.

Further, the loader device 152 has loader posts 162 which are arranged both right and left sides of the travel machine body 156, a pair of right and left lift arms 163 which are connected to upper ends of the loader posts 162 so as to be freely oscillated up and down, and a bucket 164 which is connected to leading end portions of the right and left lift arms 163 so as to be freely oscillated up and down.

Lift cylinders 166 for oscillating up and down the lift arms 163 are respectively provided between the loader posts 162 and the corresponding lift arms 163. Bucket cylinders 168 for oscillating up and down the bucket 164 are provided between the right and left lift arms 163 and the bucket 164. In this case, a hydraulic force of the loading work hydraulic pump device 160 is controlled according to an operation of a loader lever (not shown) by the operator on the control seat 159, the lift cylinders 166 and the bucket cylinders 168 are actuated to be expanded and contracted, and oscillate up and down the lift arms 163 and the bucket 164, and the loading work is adapted to be executed. The urea water tank 71 is inward provided in an upper portion in a forward lateral side of the hood 155. Further, the radiator 19 arranged so as to be opposed to the cooling fan 24 is inward provided in a rear portion of the hood 155.

The embodiments of the present invention relates to an engine device such as a diesel engine which is mounted to an agricultural machine (a tractor and a combine harvester) or a construction machine (a bulldozer, a hydraulic excavator, and a loader), and more particularly to an engine device to which an exhaust gas purification device is mounted, the exhaust gas purification device removing particulate matters (soot and particulate) included in exhaust gas, or nitrogen oxides (NOx) included in the exhaust gas.

What is claimed is:

1. An engine device comprising:
   a urea mixing pipe configured to inject urea water into exhaust gas of an engine, the urea mixing pipe comprising an exhaust gas inlet side and an exhaust gas outlet side;
   a urea water injection body coupled to the exhaust gas inlet side of the urea mixing pipe;
   a urea water supply hose connected to the urea water injection body;
   an SCR case configured to remove nitrogen oxides in the exhaust gas of the engine, the SCR case comprising:
      an inlet side connected to the exhaust gas outlet side of the urea mixing pipe, and
      an exhaust gas outlet side;
   a support member connected to the exhaust gas outlet side of the SCR case and to the exhaust gas inlet side of the urea mixing pipe; and
   a clamp member configured to secure the urea water supply hose to the support member.

2. The engine device according to claim 1, the support member comprising:
   a mixing pipe support body, and
   a support stay body configured to be detachably connected to the mixing pipe support body, wherein:
      the mixing pipe support body is connected to the exhaust gas inlet side of the urea mixing pipe, and
      the support stay body is connected to the exhaust gas outlet side of the SCR case.

3. The engine device according to claim 2, wherein:
   the inlet side of the SCR case is fixed to the exhaust gas outlet side of the urea mixing pipe,
   the urea water injection body comprises a urea water injection means,
   the urea mixing pipe comprises a urea water injection portion provided in the exhaust gas inlet side of the urea mixing pipe, and
   the mixing pipe support body is fixed to an outer peripheral surface of the urea water injection portion.

4. The engine device according to claim 2, wherein an exhaust pipe is fastened and fixed to the exhaust gas outlet side of the SCR case via the support stay body.

5. The engine device according to claim 2, wherein the urea water supply hose is coupled to the mixing pipe support body via the clamp member.

6. The engine device according to claim 2, further comprising a sensor bracket is fixed to the mixing pipe support body, and wherein the clamp member or a wiring connector is arranged in the sensor bracket.

7. The engine device according to claim 1, further comprising:
   an NOx sensor configured to detect the nitrogen oxides included in the exhaust gas within the SCR case; and
   an outlet side lid body having a frustoconical portion formed in the exhaust gas outlet side of the SCR case, wherein the NOx sensor is attached to the frustoconical portion.

8. The engine device according to claim 7, wherein: the SCR case comprises:
   an inlet side lid body,
   the outlet side lid body,
   an inner case comprising:
      an exhaust gas inlet side covered by the inlet side lid body, and
      an exhaust gas outlet side covered by the outlet side lid body, and
   an outer case disposed around at least a portion of an outer peripheral side of the inner case between the inlet side lid body and the outlet side lid body.

9. The engine device according to claim 8, further comprising:
   a spacer body disposed between an outer peripheral surface of the inner case and an inner peripheral surface of the outer case
   wherein the outer case is connected to the outer peripheral side of the inner case via the spacer body.

10. The engine device according to claim 1, further comprising a urea water injection means positioned at the exhaust gas inlet side of the urea mixing pipe.

11. The engine device according to claim 10, wherein the urea water supply hose is firmly fixed to the support member by the clamp member.

12. The engine device according to claim 11, wherein the support member comprises:
- a mixing pipe support body connected to the exhaust gas inlet side of the urea mixing pipe;
- a support stay body connected to the exhaust gas outlet side of the SCR case; and
- a sensor bracket connected to the clamp member; wherein:
  - the sensor bracket is detachably connected to the mixing pipe support body; and
  - the support stay body is detachably connected to the mixing pipe support body.

13. The engine device according to claim 12, further comprising:
- a urea water tank configured to hold a urea water solution; and
- a urea water injection pump connected to the urea water injection body via the urea water supply hose; and
- wherein the urea water injection pump is configured to provide the urea water solution into the urea mixing pipe via the urea water injection body.

14. An engine device comprising:
- a urea mixing pipe configured to inject urea water into an exhaust gas, the urea mixing pipe comprising an inlet side and an outlet side;
- an SCR case configured to remove nitrogen oxides in the exhaust gas, the SCR case comprising an inlet side and an outlet side connected to the inlet side of the urea mixing pipe;
- a support stay body extending from the inlet side of the SCR case;
- an exhaust pipe fastened to the outlet side of the SCR case via the support stay body;
- a mixing pipe support body extending from the outlet side of the urea mixing pipe; and
- wherein the mixing pipe support body is detachably coupled to the support stay body.

15. The engine device according to claim 14, further comprising:
- a urea water injector;
- a urea water supply hose connected to the urea water injector; and
- a clamp member configured to secure the urea water supply hose to the support stay body.

16. The engine device according to claim 15, further comprising:
- a sensor bracket coupled to the clamp member.

17. An engine device comprising:
- a urea mixing pipe configured to inject urea water into an exhaust gas, the urea mixing pipe comprising an inlet side and an outlet side;
- a urea water injection body coupled to the inlet side of the urea mixing pipe;
- an SCR case configured to remove nitrogen oxides in the exhaust gas, the SCR case comprising an outlet side and an inlet side connected to the outlet side of the urea mixing pipe;
- a support stay body extending from the inlet side of the SCR case;
- an exhaust pipe fastened to the outlet side of the SCR case via the support stay body; and
- a frustoconical portion coupled to the outlet side of the SCR case.

18. The engine device according to claim 17, further comprising:
- a NOx sensor attached to the frustoconical portion; and
- wherein the NOx sensor is configured to detect the nitrogen oxides in the exhaust gas within the SCR case.

19. The engine device according to claim 18, wherein the urea water injection body comprises a urea water injection means.

* * * * *